(12) United States Patent
Ouchi

(10) Patent No.: US 10,548,123 B2
(45) Date of Patent: Jan. 28, 2020

(54) TERMINAL DEVICE, BASE STATION DEVICE, AND METHOD

(71) Applicant: SHARP KABUSHIKI KAISHA, Sakai, Osaka (JP)

(72) Inventor: Wataru Ouchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/573,575

(22) PCT Filed: May 13, 2016

(86) PCT No.: PCT/JP2016/064355
§ 371 (c)(1),
(2) Date: Nov. 13, 2017

(87) PCT Pub. No.: WO2016/186044
PCT Pub. Date: Nov. 24, 2016

(65) Prior Publication Data
US 2018/0152924 A1 May 31, 2018

(30) Foreign Application Priority Data
May 15, 2015 (JP) .................................. 2015-099555

(51) Int. Cl.
*H04W 72/04* (2009.01)
*H04W 4/70* (2018.01)
*H04W 72/00* (2009.01)
*H04W 88/02* (2009.01)
*H04W 88/08* (2009.01)

(52) U.S. Cl.
CPC ........... *H04W 72/042* (2013.01); *H04W 4/70* (2018.02); *H04W 72/005* (2013.01); *H04W 72/0453* (2013.01); *H04W 88/02* (2013.01); *H04W 88/08* (2013.01)

(58) Field of Classification Search
CPC ..... H04W 72/042; H04W 4/70; H04W 48/10; H04W 72/005; H04W 72/04; H04W 72/0453; H04W 88/02; H04W 88/08
See application file for complete search history.

(56) References Cited

U.S. PATENT DOCUMENTS

2014/0301305 A1  10/2014  Xu et al.
2015/0341957 A1  11/2015  Tang et al.
(Continued)

FOREIGN PATENT DOCUMENTS

WO   2013129374 A1   9/2013
WO   2014/121461 A1   8/2014

OTHER PUBLICATIONS

Nokia Networks, 3GPP TSG-RAN WG2 Meeting #89bis, Bratislava, Slovakia, Apr. 20-24, 2015, R2-151120 (Year: 2015).*

(Continued)

*Primary Examiner* — Luat Phung
(74) *Attorney, Agent, or Firm* — ScienBiziP, P.C.

(57) ABSTRACT

A terminal device configured to communicate with a base station device, and the terminal device includes: a reception unit configured to receive an MIB from a PBCH, and in a case where, from the MIB, a bit indicating support for MTC is set to a predetermined value, the reception unit receives, from a given subframe, the MTC including a physical channel configuration associated with the MTC.

4 Claims, 7 Drawing Sheets

(56) References Cited

U.S. PATENT DOCUMENTS

| | | | |
|---|---|---|---|
| 2015/0373694 A1* | 12/2015 | You | H04L 5/0051 |
| | | | 370/329 |
| 2017/0208627 A1* | 7/2017 | You | H04W 72/0446 |
| 2017/0257846 A1* | 9/2017 | Kim | H04W 72/04 |
| 2017/0373902 A1* | 12/2017 | Zhang | H04W 48/12 |
| 2018/0019839 A1* | 1/2018 | Chen | H04L 1/0038 |

OTHER PUBLICATIONS

Huawei, HiSilicon, SIB transmission for MTC UEs, 3GPP TSG RAN WG1 Meeting #80bis, Beigrade, Serbia, Apr. 20-24, 2015. R1-151876.

KDDI corporation, Discussion on simultaneous usage of the MTC enhancement functions, 3GPP TSG RAN WG1 Meeting #79, San Francisco, USA, Nov. 17-21, 2014. R1-144931.

Nokia Networks: "MIB analysis for Low cost MTC", R2-151067, 3GPP TSG-RAN WG2 Meeting #89bis, Bratislava, Slovakia, Apr. 20-24, 2015.

Nokia Networks: "M-SIB1 analysis for Low cost MTC", R2-151141, 3GPP TSG-RAN WG2 Meeting #89bis, Bratislava, Slovakia, Apr. 20-24, 2015.

Intel Corporation: "Email discussion report on [89bis#24] [LTE/MTCe2] SIB Contents", R2-152161, 3GPP TSG RAN WG2 Meeting #90, Fukuoka, Japan, May 25-29, 2015.

* cited by examiner

TERMINAL DEVICE, BASE STATION DEVICE, AND METHOD

TECHNICAL FIELD

The Embodiments of the present invention relate to a technique for a terminal device, a base station device, and a method that enable efficient sharing of channel state information.

This application claims priority based on JP 2015-099555 filed on May 15, 2015, the contents of which are incorporated herein by reference.

BACKGROUND ART

The 3rd General Partnership Project (3GPP), which is a standardization project, has standardized the Evolved Universal Terrestrial Radio Access (EUTRA), in which high-speed communication is realized by adopting an Orthogonal Frequency Division Multiplexing (OFDM) communication scheme and flexible scheduling in a unit of predefined frequency and time called a resource block. The overall communications that have employed the standardized EUTRA technology may be referred to as Long Term Evolution (LTE) communications.

Moreover, the 3GPP discusses the Advanced EUTRA (A-EUTRA), which realizes higher-speed data transmission and has upper compatibility with the EUTRA. The EUTRA relates to a communication system based on a network in which base station devices have substantially an identical cell configuration (cell size); however, regarding the A-EUTRA, discussion is made on a communication system based on a network (heterogeneous wireless network, heterogeneous network) in which base station devices (cells) having different configurations coexist in the same area.

The 3GPP discusses Machine Type Communication (MTC) performed by using a communication device (a terminal device and/or a base station device) such as a smart meter that has low mobility or is stationary, other than a cellular phone (NPL 1).

In NPL 1, for reducing the cost of the machine type communication, it may not be able to realize or may become difficult to realize functions that have been realized.

CITATION LIST

Non-Patent Document

[NON-PATENT DOCUMENT 1] NPL 1: R1-144931, KDDI corporation, 3GPP TSG RAN WG1 Meeting #79, 17-21 Nov. 2014.

DISCLOSURE OF THE INVENTION

Problems to be Solved by the Invention

Communicating methods (transmission methods and/or reception methods and/or control methods) known in the art are not applicable without change to communication devices (terminal devices and/or base station devices), in a case where the communication devices do not have a function/performance that is not enabled in the known communication device, or in a case where a function/performance that is enabled by the known communication device is improved/enhanced.

Some aspects of the present invention have been made in view of the above described situations, and an object is to provide a terminal device, a base station device and a method that enables efficiently control communication, in a case where a function/performance that is achieved by the known communication device is not provided, or in a case where the function/performance that is not achieved by the known communication device is enhanced.

Means for Solving the Problems (1) In order to accomplish the above-described object, according to some aspects of the present invention, the following measures are provided. A terminal device according to one aspect of the present invention is a terminal device configured to communicate with a base station device. The terminal device includes a reception unit configured to receive a Master Information Block (MIB) from a Physical Broadcast CHannel (PBCH), and in a case where, from the MIB, a bit associated with Machine Type Communication (MTC) is set to a predetermined value, the reception unit receives a System Information Block (MTC SIB) including a physical channel configuration associated with Machine Type Communication (MTC) from a predetermined subframe.

(2) In addition, a base station device according to one aspect of the present invention is a base station device configured to communicate with a terminal device. The base station device includes a transmission unit configured to transmit a Physical Broadcast CHannel (PBCH) in a given period and in a subframe, and the transmission unit, in a case of supporting a function associated with a Machine Type Communication (MTC), sets a bit associated with the MTC in a Master Information Block (MIB), and transmits the PBCH, to which the MIB is mapped, in the subframe and in a given subframe different from the subframe.

(3) Further, a method according to one aspect of the present invention is a method by a terminal device configured to communicate with a base station device. The method includes the steps of: receiving a Master Information Block (MIB) from a Physical Broadcast CHannel (PBCH); and in a case where, from the MIB, a bit associated with Machine Type Communication (MTC) is set to a predetermined value, receiving a System Information Block (MTC SIB) including a physical channel configuration associated with the MTC from a predetermined subframe.

(4) Furthermore, a method according to one aspect of the present invention is a method by a base station device configured to communicate with a terminal device. The method includes the steps of: transmitting a Physical Broadcast CHannel (PBCH) in a given period and in a subframe; in a case of supporting a function associated with a Machine Type Communication (MTC), setting a bit associated with the MTC to a Master Information Block (MIB); and transmitting the PBCH, to which the MIB is mapped, in the subframe and in a specific subframe different from the subframe.

Effects of the Invention

According to some aspects of the present invention, transmission efficiency is improved in a radio communication system, in which a base station device and a terminal device communicate.

MODE FOR CARRYING OUT THE INVENTION

First Embodiment

Figure 1:
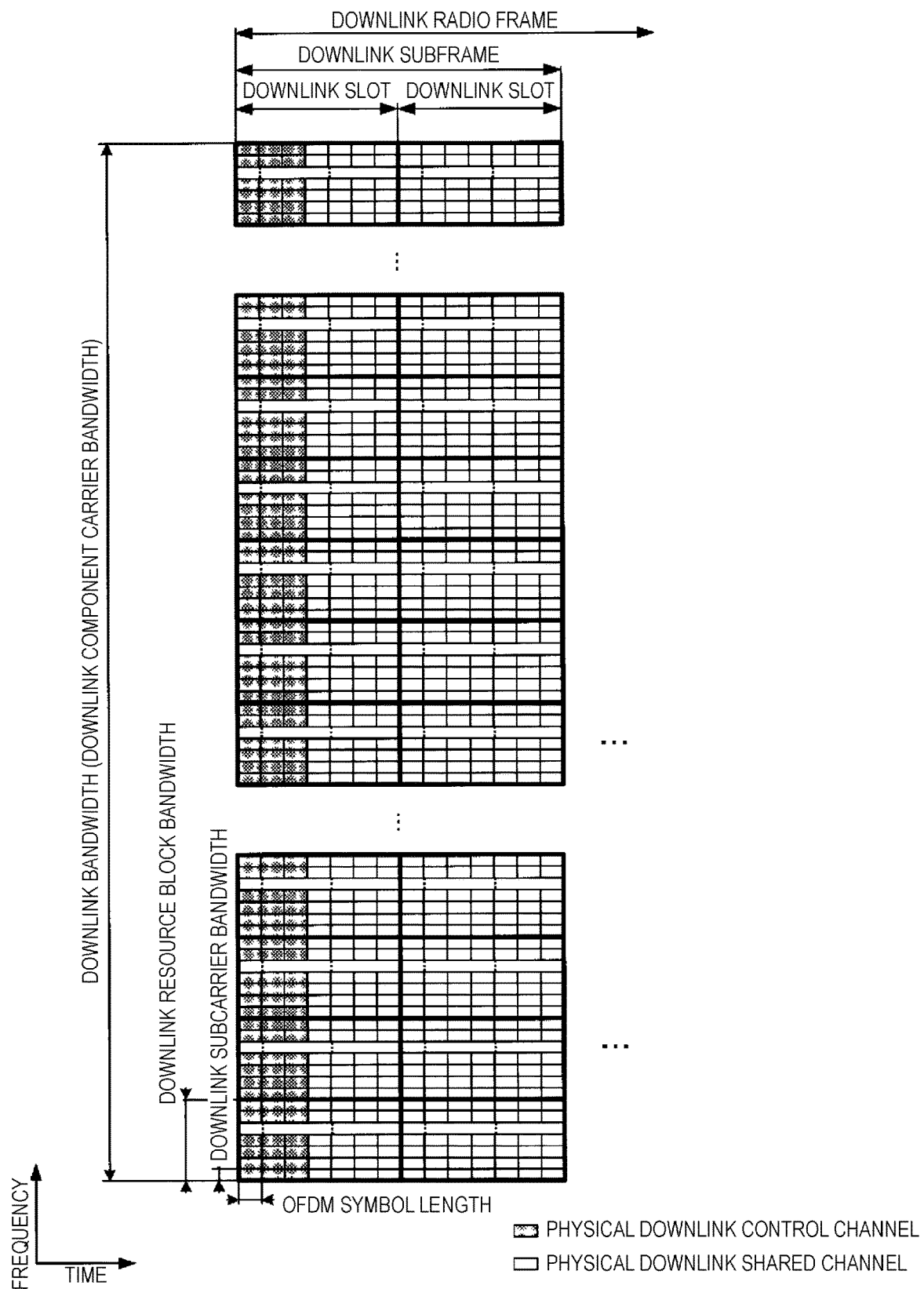
FIG. 1 is a diagram illustrating an example of a downlink radio frame configuration according to a first embodiment.

A first embodiment of the present invention will be described below. Description will be given by using a communication system in which a base station device (base station, NodeB, or EUTRAN NodeB (eNB)) and a terminal device (terminal, mobile station, user device, or user equipment (UE)) communicate in a cell.

Main physical channels and physical signals used in the EUTRA and the A-EUTRA will be described. The "channel" refers to a medium used to transmit a signal, and the "physical channel" refers to a physical medium used to transmit a signal. In the present embodiment, the physical channel may be used synonymously with "signal". In the future EUTRA and A-EUTRA, another physical channel may be added, the constitution or format of the existing physical channel may be changed, or another constitution or format may be added; however, the description of each embodiment of the present invention will not be affected even if such addition or change is performed.

In the EUTRA and the A-EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time slot (one slot).

HD-FDD has two types: for a type A HD-FDD operation, a guard period is created by a terminal device by not receiving the last part (last symbol) of a downlink subframe immediately before an uplink subframe from the same terminal device; and for a type B HD-FDD operation, guard periods, each referred to as an HD guard subframe, are created by a terminal device by not receiving a downlink subframe immediately before an uplink subframe from the same terminal device, and by not receiving a downlink subframe immediately after an uplink subframe from the same terminal device. That is, in the HD-FDD operation, a guard period is created by the terminal device controlling a reception process of the downlink subframe.

A frame structure type 2 is applicable to TDD. Each radio frame is constituted of two half-frames. Each half-frame is constituted of five subframes. A UL-DL configuration in a given cell may vary among radio frames, and the subframe in uplink or downlink transmission may be controlled in the latest radio frame. The UL-DL configuration in the latest radio frame is acquirable via a PDCCH or higher layer signaling. Note that the UL-DL configuration indicates a constitution of an uplink subframe, a downlink subframe, and a special subframe, in TDD. The special subframe is constituted of a DwPTS enabling downlink transmission, a Guard Period (GP), and a UpPTS enabling uplink transmission. The configurations of a DwPTS and a UpPTS in a special subframe are managed in a table, so that the terminal device can acquire the constitution via higher layer signaling. Note that the special subframe serves as a switch point from downlink to uplink.

In order to achieve reduced cost and low complexity (design/configuration with low complexity, simplified design/configuration) of the machine type communication, the number or functions of processing units (a transmission unit, a reception unit, a control unit, and the like) included in a communication device (a terminal device and/or a base station device, a device, or a module) may be limited. For example, a Radio Frequency (RF) unit, an Intermediate Frequency (IF) unit, and a baseband unit are each provided as a single unit to be used for the transmission unit and the reception unit, in some cases. That is, such a single unit may be shared between the transmission unit and the reception unit. A bandwidth supported by a filter unit, a Single Carrier-Frequency Division Multiple Access (SC-FDMA) signal transmission unit/reception unit, an OFDM signal transmission unit/reception unit, an uplink subframe generation unit, a downlink subframe generation unit, and the like provided in the transmission unit and the reception unit may be limited (for example, 1.4 MHz). Moreover, the performance of an amplifier provided in the transmission unit and the reception unit is limited, and thus power class/power value may be lower than the power class/power value of a known transmission unit or a known reception unit. That is, a communicable range (coverage) of the communication device enabling the machine type communication may be narrower than that of a known communication device. In addition, the number of antennas (antenna ports) included in the transmission unit and the reception unit may be limited. That is, a functionality of Multiple Input Multiple Output (MIMO) may not be supported.

A terminal device used for the machine type communication according to one aspect of the present invention may be referred to as an MTC terminal or Low-Complexity terminal (LC terminal) in order to be differentiated from a terminal device such as a cellular phone. Note that, according to one aspect of the present invention, examples of the terminal device include an MTC terminal. Furthermore, an example of the terminal device according to one aspect of the present invention may include an LC terminal. Furthermore, an example of the terminal device according to one aspect of the present invention may include an enhanced coverage terminal (EC terminal). Furthermore, the communication device according to one aspect of the present invention may be capable of supporting coverage enhancement to secure the communicable range or communication quality. That is, the terminal device of the present invention may be referred to as an enhanced coverage terminal. Furthermore, the terminal device according to one aspect of the present invention may be referred to as a low-complexity terminal. Furthermore, the MTC terminal may be referred to as an LC terminal or an EC terminal. That is, examples of the MTC terminal may include the LC terminal and the EC terminal. However, the LC terminal and the EC terminal may be differentiated from each other, and may belong to different types/categories. A terminal that supports an LTE communication technology/service may be referred to as an LTE terminal. The MTC terminal is one type of the LTE terminals; however, the MTC terminal is a terminal with a lower cost and lower complexity than a known LTE terminal. That is, the MTC terminal serves as an LTE terminal specialized/limited to a specific function. Herein, the known LTE terminal is simply referred to as an LTE terminal.

The terminal device and the base station device performing the MTC may transmit/receive small amount of data. An MTC terminal may be specialized in the transmission/reception of a small amount of the data.

The LC terminals are targeted to low-end applications (e.g., applications having low average sales per user, low data rate, and delay tolerance), for example, the MTC. The LC terminals belong to a terminal category 0, and may have lower performance for transmission and reception than terminals belonging to other categories. The LC terminals may be referred to as category 0 terminals. Note that, the LC terminals may have simpler structures in a transmission unit (transmission circuit) and a reception unit (reception circuit) than the LTE terminals. For example, the number of RF units (RF circuits) and transmit antennas/receive antennas (antenna ports) may be smaller than the number in an LTE terminal. Moreover, the LC terminals may support limited functions in comparison with the LTE terminals. In addition, the LC terminals may support narrower bandwidth (transmission/reception bandwidth, measurement bandwidth, and channel bandwidth) than the bandwidth of the LTE terminals. For example, the LC terminals may have a limited function associated with filtering.

Moreover, examples of the LC terminals basically include low-end model terminals, whereas examples of the EC terminals may include both low-end model terminals and high-end model terminals. Functionalities relating to the EC may be used in terminals not only in category 0 but also in other categories.

An LC terminal may access only a cell indicated by an SIB 1, in which access from the LC terminal is supported. Unless the cell supports the LC terminal, the LC terminal determines that the cell is inaccessible.

The base station device determines that the terminal device is an LC device, based on a Logical Channel ID (LCID) for a Common Control CHannel (CCCH) and capability information (performance information) on the terminal device.

S1 signaling has been extended including terminal radio capability information for paging. When such paging-specific capability information is provided by the base station device to a Mobility Management Entity (MME), the MME uses this information to indicate to the base station device that a paging request from the MME is related to the LC terminal.

In contrast, the EC terminal is intended for coverage enhancement and/or improvement in communication quality within the coverage. For example, the EC terminal possibly communicates in a poor communication environment such as in a basement, at a cell-edge, and between buildings.

The capability information of the terminal device (UE radio access capability, UE EUTRA capability) initiates a procedure for the terminal device in a connected mode, when the base station device (EUTRAN) needs the capability information on the terminal device. The base station device inquires for the capability information on the terminal device, and transmits, in response to the inquiry, the capability information on the terminal device. The base station device determines whether the capability information is supported. In a case where the capability information is supported, the base station device transmits configuration information corresponding to the capability information via, for example, higher layer signaling, to the terminal device. The configuration information corresponding to the capability information has been configured, and therefore, the terminal device determines that transmission/reception based on the capability can be performed.

FIG. 1 is a diagram illustrating an example of a downlink radio frame configuration according to the present embodiment. In the downlink, an OFDM access scheme is used. In the downlink, a Physical Downlink Control CHannel (PDCCH), an Enhanced Physical Downlink Control CHannel (EPDCCH), a Physical Downlink Shared CHannel (PDSCH), and the like are allocated. A downlink radio frame includes downlink Resource Block (RB) pairs. The downlink RB pairs are each a unit for allocation of downlink radio resources and the like, and is constituted of a frequency band of a predefined width (RB bandwidth) and a time duration (two slots equal to one subframe). Each of the downlink RB pairs is constituted of two downlink RBs (RB bandwidth× slot) that are contiguous in time domain. Each of the downlink RBs is constituted of 12 subcarriers in frequency domain. In the time domain, the downlink RB is constituted of seven OFDM symbols, in a case where a Normal Cyclic Prefix (Normal CP: NCP) is added, while the downlink RB is constituted of six OFDM symbols, in a case where a cyclic prefix that is longer than the normal cyclic prefix (Extended CP: ECP) is added. A region defined by a single subcarrier in the frequency domain and a single OFDM symbol in the time domain is referred to as a resource element (RE). The PDCCH/EPDCCH is a physical channel on which Downlink Control Information (DCI) such as a terminal device identity, PDSCH scheduling information, PUSCH scheduling information, a modulation scheme, a coding rate, and a retransmission parameter is transmitted. Note that although a downlink subframe in a single Component Carrier (CC) is described here, a downlink subframe is defined for each CC and downlink subframes are substantially synchronized between the CCs.

A Synchronization Signal (SS), a Physical Broadcast CHannel (PBCH), and a DownLink Reference Signal (DLRS) may be allocated in the downlink subframes, although not illustrated here. Examples of the DLRS include a Cell-specific Reference Signal (CRS), a Channel State Information Reference Signal (CSI-RS), a User Equipment-specific Reference Signal (UERS), and a Demodulation Reference Signal (DMRS). The CRS is transmitted through the same antenna port (transmit port) as that for PDCCH, the CSI-RS is used to measure Channel State Information (CSI), the UERS is transmitted through the same antenna port as that for some PDSCHs, and the DMRS is transmitted through the same transmit port as that for EPDCCH. Moreover, carriers on which no CRS is mapped may be used. In this case, a similar signal (referred to as an enhanced synchronization signal) to a signal corresponding to some antenna ports (e.g., only antenna port 0) or all the antenna ports for the CRS can be inserted into some subframes (e.g., the first and sixth subframes in the radio frame) as time and/or frequency tracking signals. Here, an antenna port may be referred to as a transmit port. Here, the term "physical channel/physical signal is transmitted through an antenna port" includes a meaning that a physical channel/ physical signal is transmitted via a radio resource or layer corresponding to the antenna port. For example, the reception unit is intended to receive a physical channel or physical signal via a radio resource or layer corresponding to the antenna port.

Figure 2:
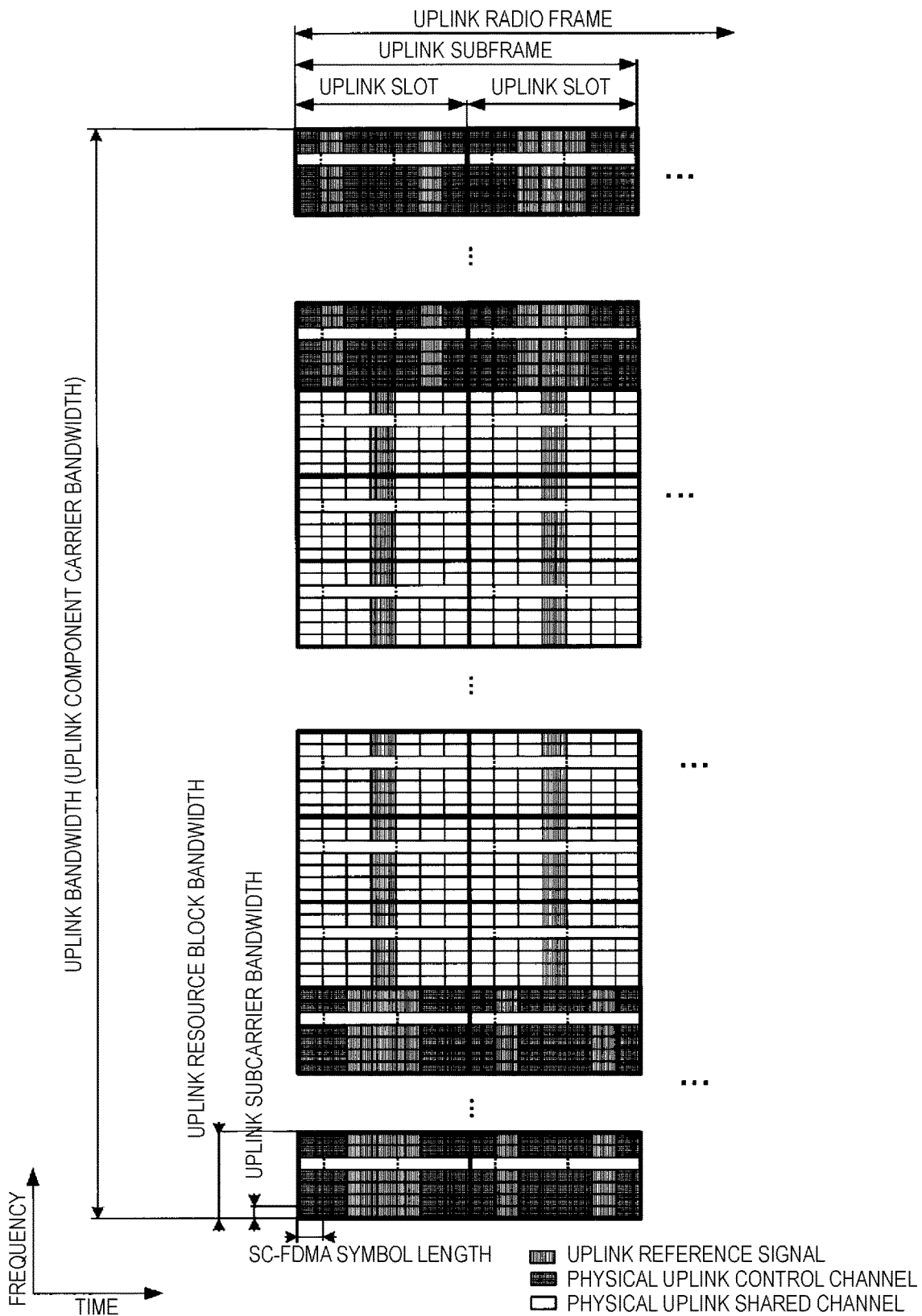
FIG. 2 is a diagram illustrating an example of an uplink radio frame configuration according to the first embodiment.

FIG. 2 is a diagram illustrating an example of an uplink radio frame configuration according to the present embodiment. An SC-FDMA scheme is used in the uplink. In the uplink, a Physical Uplink Shared CHannel (PUSCH), a Physical Uplink Control CHannel (PUCCH), and the like are allocated. An uplink reference signal is also allocated together with the PUSCH and the PUCCH. An uplink radio frame is constituted of uplink RB pairs. The uplink RB pairs are each a unit for allocation of uplink radio resources and the like, and is constituted of a frequency domain of a predefined width (RB bandwidth) and a time domain (two slots equal to one subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols when a Normal Cyclic Prefix (Normal CP) is added, while the uplink RB is constituted of six SC-FDMA symbols, in a case where a cyclic prefix that is longer than the normal cyclic prefix (Extended CP) is added. Note that although an uplink subframe in a single CC is described here, an uplink subframe is defined for each CC.

A synchronization signal is constituted of one of three types of Primary Synchronization Signals (PSSs) and a Secondary Synchronization Signal (SSS) including 31 types of codes that are interleaved in the frequency domain. 504 patterns of cell identities (physical cell IDs (PCIs)) for respectively identifying base station devices, and frame timings for radio synchronization are indicated by combinations of the PSS and the SSS. The terminal device identifies the physical cell ID in a synchronization signal received by cell search.

The Physical Broadcast CHannel (PBCH) is used to notify (configure) control parameters (broadcast information, System Information (SI)) that are commonly used by terminal devices in a cell. The terminal devices in the cell are notified, on the PDCCH, of the radio resource in which broadcast information is transmitted. Broadcast information that is not notified on the PBCH is transmitted, as a layer-3 message (system information) for making notification of the broadcast information on the PDSCH, in the radio resource that has been notified. The TTI (repetition rate) of PBCH to which a Broadcast Channel (BCH) is mapped is 40 ms.

Six RBs (that is, 72 REs, 72 subcarrier) at the center of the transmission bandwidth (or system bandwidth) are allocated to the PBCH. Moreover, the PBCH is transmitted on 4 contiguous radio frames starting from a radio frame satisfying SFN (system frame number, radio frame number) mod 4=0. A scramble sequence of PBCH is initialized with the PCI in each radio frame satisfying the radio frame number (SFN) mod 4=0. The number of antenna ports for PBCH is the same as the number of antenna ports for CRS. The PDSCH is not transmitted in resources to which the PBCH or CRS is allocated (mapped). That is, the terminal device does not expect that the PDSCH is mapped to the same resource for the PBCH or CRS. In addition, the base station device does not map the PDSCH to the same resource for the PBCH or CRS.

The PBCH is used to broadcast system control information (Master Information Block (MIB)).

The MIB includes system information transmitted on a BCH. For example, the system information included in the MIB includes downlink transmission bandwidth, a PHICH configuration, and a system frame number. The MIB also includes spare bits (bit sequence) of 10 bits. Note that the downlink transmission bandwidth may be included in mobility control information. The mobility control information may be included in information on an RRC connection reconfiguration. That is, the downlink transmission bandwidth may be configured via an RRC message/higher layer signaling.

In a case that a configuration associated with the MTC is set to spare bits of the MIB, the MIB may be determined as a MTC SIB 1. The MTC terminal that has detected the MTC SIB 1 may initiate, based on such a configuration, reception of the MTC SIB 1 in a subframe different from the subframe, to which the MIB (PBCH) is transmitted. Note that the MTC SIB 1 may be referred to as another name such as a SIB 20. That is, the SIB including a parameter in the SIB 1 may be defined as the SIB, which can be received by the terminal device supporting MTC functions. For example, the SIB including a parameter, which is included not only in the SIB 1 but also in a SIB 2 or a SIB 3, may be defined as the SIB, which can be received by the terminal device supporting the MTC functions.

Information/parameters associated with resources (the PDSCH resource, and the PDCCH/EPDCCH resource on which the DL-SCH (PDSCH) is scheduled), to which the configuration related to the MTC is transmitted, may be configured by using the spare bits of the MIB. That is, the base station device may notify the MTC terminal of a resource, to which a system information message including a configuration associated with the MTC is allocated, by using the spare bits of the MIB. The terminal device may receive a configuration associated with the MTC, based on the information related to the resource. The terminal device may receive the configuration associated with the MTC by using the MIB. Further, the terminal device may receive the configuration associated with the MTC by using the PDSCH indicated by higher layer signaling. Further, the terminal device may receive the configuration associated with the MTC by using the PDSCH indicated through the PDCCH/EPDCCH.

Transport Block Size (TBS) may be included as a configuration associated with the MTC. Further, a configuration associated with the PDSCH (DL-SCH) for transmitting each SIB/Random Access Response (RAR)/paging may be included as the configuration associated with the MTC. That is, the configuration associated with the PDSCH may be configured individually for each SIB/Random Access Response (RAR)/paging. Further, the configuration associated with the MTC may include a configuration associated with EPDCCH Common Search Space (CSS). Further, the configuration associated with the PDSCH may include a configuration related to a time frequency resource, a configuration related to a Modulation and Coding Scheme (MCS), and a configuration related to a TBS. The configuration associated with the MTC may include a configuration related to frequency hopping for each physical channel. For example, the configuration associated with the time frequency resource may include a period, a subframe subset, a frequency position, or transmission bandwidth.

System information to be transmitted in another form than the MIB is transmitted in a System Information Block (SIB). A system information message (SI message) is used to transmit one or more SIBs. All the SIBs included in the SI message are transmitted at the same intervals. Furthermore, all the SIBs are transmitted on a Downlink Shared CHannel (DL-SCH). Note that the DL-SCH may be referred to as DL-SCH data or a DL-SCH transport block. Note that the transport block is used synonymously with a transport channel according to one aspect of the present invention.

The resource allocation of the PDSCH, on which the DL-SCH having an SI message mapped is transmitted, is indicated by a PDCCH along with a CRC scrambled with an SI-RNTI. The search space of the PDCCH along with the CRC scrambled with the SI-RNTI is a CSS.

The resource allocation for a PDSCH, on which the DL-SCH having information on a random access response mapped is transmitted, is indicated by a PDCCH along with a CRC scrambled with an RA-RNTI. The search space of the PDCCH along with the CRC scrambled with the RA-RNTI is a CSS.

The resource allocation of the PDSCH, on which a PCH having a paging message mapped is transmitted, is indicated by a PDCCH along with a CRC scrambled with a P-RNTI. The search space of the PDCCH along with the CRC scrambled with the P-RNTI is a CSS. Note that the PCH may be referred to as PCH data or a PCH transport block. The paging message may be used synonymously with the PCH, according to one aspect of the present invention.

In a case where a parameter associated with the resource allocation of the PUSCH and/or PDSCH is configured for an MTC terminal through higher layer signaling (RRC signaling, system information), the resource allocation of the PUSCH and/or PDSCH may not be necessarily indicated by using the PDCCH/EPDCCH. That is, in a case where the resource allocation of the PUSCH and/or the PDSCH is indicated through the higher layer signaling, the MTC terminal may transmit the PUSCH and/or receive the PDSCH, based on such information. Here, the resource allocation may include a configuration associated with the resource allocation. For example, such a configuration may include a parameter associated with a frequency position. Further, the configuration may include a parameter associated with bandwidth. Further, the configuration may include a parameter associated with the number of antenna ports and/or an antenna port number. Further, the configuration may include a parameter used for sequence generation. Further, the configuration may include a parameter associated with the electric power used for the resource allocation. Further, the configuration may include a parameter associated with a cyclic shift.

SIBs respectively have different pieces of system information that are transmittable. That is, different information is indicated for each type.

For example, a System Information Block type 1 (SIB 1) includes information related to estimation (evaluation, measurement), when the terminal device makes access to a given cell, and defines scheduling of other system information. For example, the SIB 1 includes: information related to cell access such as a PLMN identity list, a cell identity, and a CSG identity; cell selection information; a maximum power value (P-Max); a frequency band indicator; an SI-window length; transmission periodicity of an SI message; a TDD configuration, and the like.

Upon receiving the SIB 1 through broadcasting or dedicated signaling, in a case where the terminal device is in an idle mode or in a connected mode while T311 is in operation, and the terminal device is a category 0 terminal, and in a case where information indicating that the category 0 terminal is allowed to access a cell (category0Allowed) is not included in the SIB 1, the terminal device determines that access to a cell is prohibited. That is, in the SIB 1, the category 0 terminal is not allowed to access a cell, the category 0 terminal cannot access the cell.

For example, a System Information Block type 2 (SIB 2) includes radio resource configuration information that is common for all terminal devices. For example, the SIB 2 includes frequency information such as an uplink carrier frequency and uplink bandwidth, and information on a time adjusting timer. The SIB 2 also includes information on a configuration for a physical channel/physical signal, such as a PDSCH, a PRACH, an SRS, and an uplink CP length. The SIB 2 further includes information on a configuration for signaling of higher layers such as RACH and BCCH.

For example, a System Information Block type 3 (SIB 3) includes information (parameter, parameter value) common for intra-frequency cell re-selection, inter-frequency cell re-selection, and inter-Radio Access Technology (RAT) cell re-selection.

Although 17 types of SIBs are provided, a new one may be added/defined according to its use.

An SI message includes an SIB different from the SIB 1.

In a case where information on the configuration of the PDCCH for the MTC terminal is included in a received MIB, the MTC terminal receives the PDCCH for the MTC terminal, based on the information. The information may include a resource block index (frequency position) corresponding to a transmission bandwidth where the PDCCH for the MTC terminal is allocated. Furthermore, the information may include an index indicating a starting position (start position, start symbol) of the OFDM symbol, to which the PDCCH for the MTC terminal is allocated. Furthermore, the information may include the number of OFDM symbols demanded for the PDCCH for the MTC terminal. Note that such information may be provided/updated to the MTC terminal via other SIBs or dedicated signaling.

On the PBCH, a coded BCH transport block is mapped to four subframes within a 40 ms interval. Such 40-ms timing for the PBCH is blindly detected. That is, there is no explicit signaling indicating the 40-ms timing. Each subframe is assumed to be self-decodable. That is, the BCH is assumed to be in a fairly good condition, and can be decoded from a single reception.

The MIB (or PBCH) uses a fixed schedule with a period of 40 ms and repetitions within 40 ms. The first transmission of the MIB is scheduled in a subframe #0 of a radio frame that satisfies SFN mod 4=0, which is obtained by dividing System Frame Number (SFN) by 4, and the repetitions are scheduled in subframes #0 of all other radio frames. That is, information included in the MIB may be updated with the 40 ms period. Note that the SFN denotes a radio frame number.

When the terminal device informs the base station device (PLMN, EUTRA, EUTRAN), through capability information, that the terminal device has a capability for the MTC (a capability for Low Complexity (LC), a capability for Enhanced Coverage (EC)) and the base station device allows access from the MTC terminal (or has a cell to which the access from the MTC terminal is allowed), the base station device may set, in the spare bits of the MIB, information/parameter on configurations of physical channels, such as PDCCH/EPDCCH, PDSCH, PHICH, and PBCH, for the MTC terminal, and may transmit the MIB. Note that the base station device may provide the MTC terminal with an accessible cell via higher layer signaling. The base station device may repeatedly transmit the MIB (PBCH) to the MTC terminal at shorter intervals, in addition to the transmission via the above-described subframe and radio frame. For example, the PBCH for the MTC terminal may be transmitted in an MBSFN subframe. Furthermore, the MIB for the MTC terminal may be transmitted in a subframe of a measurement gap. In contrast, the MTC terminal may be configured to make receptions in a more frequently repeated manner to improve the reception accuracy. For such a PBCH, since it is not desirable that a scrambling sequence generator be initialized with an initial value (parameter) in a repeated transmission or repeated reception, the scrambling sequence generator for the PBCH may be initialized at longer intervals. That is, although the number of PBCH receptions corresponding to the MIB is increased, a timing at which the scrambling sequence generator is initialized may be adjusted in accordance with the number of repetitions.

During the repeated transmission (in a repeated transmission period), a terminal device not supporting simultaneous transmission/reception does not expect to be capable of receiving a downlink signal in a downlink subframe or in a special subframe.

During the repeated reception (in a repeated reception period), a terminal device not supporting the simultaneous transmission/reception is not expected to be capable of transmitting an uplink signal in an uplink subframe or in a special subframe.

In a case where information on a configuration of the PBCH for the MTC terminal is set to the spare bits of the MIB, the MTC terminal can monitor the PBCH for the MTC terminal, based on such a configuration. System information transmitted on this PBCH may include information on a configuration of a PHICH/Enhanced PHICH (EPHICH) for the MTC terminal and information on configurations of other physical channels, a carrier frequency for the MTC terminal, and a downlink transmission bandwidth and/or uplink transmission bandwidth for the MTC terminal. In such a case, the base station device may perform scheduling such that radio resources that have been allocated for an LTE terminal should not be allocated for the MTC terminal. That is, the base station device may perform scheduling such that FDM is applied to the MTC terminal and the LTE terminal.

Information indicating whether configurations of various physical channels for the MTC terminal are set in an SIB or an RRC message may be set in the spare bits of the MIB. For example, in a case where the configuration of a PDCCH/EPDCCH for the MTC terminal is set in an SIB or an RRC message, a value of a spare bit corresponding to the configuration is set to 1. In another case where the configuration of the PDCCH/EPDCCH for the MTC terminal is not set in the SIB or the RRC message, the value of the spare bit corresponding to the configuration is set to 0. Similarly, in a case where the configuration of a PDSCH for the MTC terminal is set in an SIB or an RRC message, a value of a spare bit corresponding to the configuration is set to 1. In another case where the configuration of the PDSCH for the MTC terminal is not set in the SIB or the RRC message, the value of the spare bit corresponding to the configuration is set to 0. A PBCH (BCCH), a PHICH, a PRACH (RACH), a PUSCH, a PUCCH, a Paging Control CHannel (PCCH), and a CCCH may be indicated in similar manners. The MTC terminal may read values of corresponding bits, may acquire configuration information from the corresponding SIB or RRC message, and may transmit or receive the corresponding signal.

Allocation information on radio resources (such as resource configuration, subframe configuration, transmission bandwidth, and a starting symbol), to which the MTC terminal is allowed to access, may be set to the spare bits of the MIB. In accordance with the information, the MTC terminal can receive a PBCH (second PBCH) and a PDCCH (second PDCCH or EPDCCH) for the MTC terminal. A PHICH configuration corresponding to the PDCCH may be set to the system information corresponding to the PBCH. Values of various RNTIs may be set to the system information. When the CRC of the PDCCH is scrambled with an SI-RNTI, system information corresponding to the MTC terminal can be received via the PDSCH (DL-SCH) corresponding to the PDCCH. The MTC terminal can acquire, in accordance with the system information, information on configurations of various physical channels/physical signals for the MTC terminal. Information on such configurations may include the number of repetitions. Furthermore, the information on such configurations may include information on a power class. Furthermore, the information on such configurations may include each RNTI value.

In the system information on the second PBCH, a downlink transmission bandwidth for the MTC terminal and a starting symbol of the second PDCCH/EPDCCH may be indicated. The MTC terminal can receive the second PDCCH/EPDCCH, based on the downlink transmission bandwidth and the starting symbol. Furthermore, with the second PDCCH/EPDCCH including the CRC scrambled with an SI-RNTI, an SIB (SI message) for the MTC terminal is detectable. The information on the configurations of a physical channel/physical signal that are indicated in the SIB corresponds to a physical channel/physical signal for the MTC terminal. The MTC terminal can transmit and receive a physical channel/physical signal, based on the configured information. With the second PDCCH/EPDCCH including a CRC scrambled with a P-RNTI, a PCH for the MTC terminal is detectable. Note that in such a case, the SI-RNTI and the P-RNTI may take specific values.

As described above, the base station device sets the configuration information for the MTC terminal in the spare bits of the MIB, so that the information on configurations of various physical channels/physical signals for the MTC terminal can be configured using radio resources different from the radio resources for the LTE terminal.

The SIB 1 uses a fixed schedule with a periodic of 80 ms and repetitions within 80 ms. The first transmission of the SIB 1 is scheduled in a subframe #5 of radio frames that satisfies SFN mod 8=0, which is obtained by dividing SFN by 8, and the repetitions are scheduled in subframes #5 of all other radio frames that satisfy SFN mod 2=0.

The SI message is transmitted within periodically occurring time domain windows (SI-windows) using dynamic scheduling (PDCCH scheduling, a PDCCH together with the CRC scrambled with a System Information Radio Network Temporary Identifier (SI-RNTI)). Each SI message is associated with an SI-window, and the SI-windows of different SI messages do not overlap each other. Within a single SI-window, only the corresponding SI is transmitted. The length of the SI-window is common for all SI-messages and is configurable. Within the SI-window, the corresponding SI message can be transmitted any number of times in any subframe other than Multimedia Broadcast Multicast Service Single Frequency Network (MBSFN) subframes, uplink subframes in TDD, and in a subframe #5 of radio frames that leaves a remainder of 0 when SFN is divided by 2 (SFN mod 2=0). The terminal device acquires the detailed time-domain scheduling (and other information, such as frequency-domain scheduling and used transport format), by decoding the SI-RNTI of the PDCCH. Note that the SI message includes an SIB different from the SIB 1.

In a case where the base station device (PLMN, EUTRA, EUTRAN) is informed from the terminal device, using capability information, that the terminal device has capabilities for the MTC (a capability for Low Complexity (LC) and a capability for Enhanced Coverage (EC)), and in a case where the base station device allows access from the MTC terminal (or has a cell to which access from the MTC terminal is allowed), the base station device may set, in the SIB (either the SIB 1 or the SI message), information/parameters on configurations of physical channels, such as PDCCH/EPDCCH, PDSCH, and PHICH, for the MTC terminal, and may transmit the SIB. The base station device may transmit the SIB (an SIB 1, an SI message, or a new SIB type) for the MTC terminal repeatedly at shorter intervals, in addition to the above-described subframe and radio frame. For example, the SIB for the MTC terminal may be transmitted in an MBSFN subframe. Furthermore, the SIB for the MTC terminal may be transmitted in a subframe during a measurement gap. In contrast, the MTC terminal may be configured to make receptions in a more frequently repeated manner to improve the reception accuracy. For such PDCCH and PDSCH corresponding to the SIB, since it is not desirable that a scrambling sequence generator be initialized, based on an initial value (parameter) in repeated transmission or repeated reception, a scrambling sequence generator for the PDCCH and PDSCH may be initialized at longer intervals. That is, although the number of receptions of PDCCH and PDSCH corresponding to the SIB is increased, a timing when the scrambling sequence generator is initialized with the initial value may be adjusted in accordance with the number of repetitions.

For example, in a case where a terminal device is capable of supporting repeated reception of a downlink signal and a base station device is capable of supporting repeated transmission of a downlink signal, a generator of a scrambling sequence or a pseudo-random sequence used for a downlink signal may be initialized at a timing different from known timing. Furthermore, an initial value (parameter) used to initialize the generator of the scrambling sequence or the pseudo-random sequence used for a downlink signal may be configured with higher layer signaling, system information, or the MIB. For example, an initial value used to initialize the generator is determined on the basis of a PCI, a slot number, and the like; however, the initial value may be determined using a higher layer parameter or a predefined value (e.g., an RNTI value) that is different from the PCI, the slot number, and the like.

For example, in a case where a terminal device is capable of supporting repeated transmission of an uplink signal and a base station device is capable of supporting repeated reception of an uplink signal, a generator of a scrambling sequence or a pseudo-random sequence used for an uplink signal may be initialized at a timing different from known timing. Furthermore, an initial value (parameter) used to initialize the generator of the scrambling sequence or the pseudo-random sequence used for an uplink signal may be configured with higher layer signaling, system information, or the MIB. For example, an initial value used to initialize the generator is determined on the basis of a PCI, a slot number, and the like; however, the initial value may be determined using a higher layer parameter or a predefined value (e.g., an RNTI value) that is different from the PCI, the slot number, and the like.

Examples of the RNTI used to scramble CRC include RA-RNTI, C-RNTI, SPS C-RNTI, temporary C-RNTI, eIMTA-RNTI, TPC-PUCCH-RNTI, TPC-PUSCH-RNTI, M-RNTI, P-RNTI, and SI-RNTI. The RA-RNTI, C-RNTI, SPS C-RNTI, eIMTA-RNTI, TPC-PUCCH-RNTI, and TPC-PUSCH-RNTI are configured via higher layer signaling. The M-RNTI, P-RNTI, and SI-RNTI correspond to a single value. For example, the P-RNTI corresponds to a PCH and a PCCH, and is used to notify changes in paging and system information. The SI-RNTI corresponds to a DL-SCH and a BCCH, and is used to broadcast system information. The RA-RNTI corresponds to a DL-SCH, and is used for a random access response. The RA-RNTI, C-RNTI, SPS C-RNTI, temporary C-RNTI, eIMTA-RNTI, TPC-PUCCH-RNTI, and TPC-PUSCH-RNTI are configured with higher layer signaling. The M-RNTI, P-RNTI, and SI-RNTI are defined with predefined values.

The PDCCH together with a CRC scrambled with each RNTI may correspond to a different transport channel and a logical channel depending on an RNTI value. That is, different information may be indicated depending on the RNTI value.

A single SI-RNTI is used to be addressed in the SIB 1, as well as all the SI messages.

The terminal device applies a system information acquisition procedure to acquire the AS- and NAS-system information that is broadcasted by the EUTRAN. This procedure applies to a terminal device in an idle mode (idle state, RRC_IDLE) and in a connected mode (connected state, RRC_CONNECTED).

The terminal device needs to hold a valid version of demanded system information.

When in the idle mode, via a System Information Block type 8 (SIB 8) relying on the support for an associated RAT or a System Information Block type 17 relying on the support for a Wireless Local Area Network (WLAN) interworking assisted by a Radio Access Network (RAN), not only the SIB 2 but also the MIB and the SIB 1 are needed. That is, the needed SIB may differ depending on the function supported by the terminal device.

When in the connected mode, the MIB, the SIB 1, the SIB 2, and the SIB 17 are needed.

The terminal device deletes the system information three hours after the terminal device confirms that the stored system information is valid. That is, the terminal device does not permanently keep the system information that has been retained once. The terminal device deletes the retained system information after a lapse of a predetermined period of time.

When a system information value tag included in the SIB 1 is different from the one of the retained system information, the terminal device regards the retained system information as invalid, except for a System Information Block type 10 (SIB 10), a System Information Block type 11 (SIB 11), a System Information Block type 12 (SIB 12), and a System Information Block type 14 (SIB 14).

The terminal device is in the connected mode when an RRC connection is established. The terminal device is in the idle mode when an RRC connection is not established.

In the terminal device in the idle mode, a terminal device-specific DRX may be configured by a higher layer. Furthermore, the mobility of the terminal device in the idle mode is controlled. Further, the terminal device in the idle mode monitors a paging message (PCH) to detect an incoming call a system information change, an Earthquake and Tsunami Warning System (ETWS) notification for a terminal device capable of supporting the ETWS, a Commercial Mobile Alter System (CMAS) notification for a terminal device capable of supporting the CMAS, or an Extended Access Barring (EAB) notification for a terminal device capable of supporting the EAB. Furthermore, the terminal device in the idle mode performs neighboring cell measurements and cell (re)selection. Furthermore, the terminal device in the idle mode acquires system information. Furthermore, the terminal device in the idle mode records available measurements together with a location and a time for a terminal device with which the recorded measurements are configured.

The terminal device in the connected mode transfers unicast data to/from another terminal device. Furthermore, at lower layers (for example, a physical layer or a MAC layer), the terminal device in the connected mode may be configured with a terminal device-specific DRX. For a terminal device supporting Carrier Aggregation, one or more SCells aggregated with a PCell are used to extend a bandwidth. For a terminal device supporting dual connectivity, one Secondary Cell Group (SCG) aggregated with a Master Cell Group (MCG) is used to extend a bandwidth. Furthermore, the mobility of the terminal device in the connected mode is controlled in a network. Further, the terminal device in the connected mode monitors the PCH and/or the SIB 1 contents to detect the system information change, the ETWS notification for a terminal device capable of supporting the ETWS, the CMAS notification for a terminal device capable of supporting the CMAS, and the EAB notification for a terminal device capable of supporting the EAB. Furthermore, the terminal device in the connected mode monitors control channels associated with shared data channels for determination, in a case where data is scheduled. Furthermore, the terminal device in the connected mode provides channel quality and feedback information. Furthermore, the terminal device in the connected mode performs neighboring cell measurements and measurement reporting. Furthermore, the terminal device in the connected mode acquires system information.

The EUTRAN provides support for warning systems through measures of system information broadcast capabilities. The EUTRAN schedules and broadcasts a "warning message content" received from a Cell Broadcast Center (CBC), and, the content is forwarded (transferred/transmitted) to the EUTRAN by a MME. Schedule information for the broadcast is received along with the "warning message content" from the CBC. The EUTRAN is also responsible for paging to the terminal device to provide information indicating that an emergency warning notification is being broadcast. The "warning message content" received by the EUTRAN includes an instance (one example, one process) of the emergency warning notification. The EUTRAN may segment a second notification depending on its size before transmitting the second notification through a radio interface.

ETWS is a Public Warning System (PWS) developed to meet regulatory requirements for warning (emergency warning) notifications associated with natural disasters such as earthquake and/or tsunami events. The ETWS emergency warning include a primary notification and a secondary notification. The primary notification is a short notification transmitted within 4 seconds. The secondary notification provides detailed information. The ETWS primary notification is broadcast in a System Information Block type 10 (SIB 10). The ETWS secondary notification is broadcast in a System Information Block type 11 (SIB 11).

CMAS is a PWS developed for the delivery of multiple, concurrent warning (emergency warning) notifications. CMAS warning (emergency warning) notifications are short text messages (CMAS alerts). The CMAS warning notifications are broadcast in a System Information Block type 12 (SIB 12). The EUTRAN manages the delivery of multiple, concurrent warning notifications to the terminal device, and is responsible for handling any updates of the CMAS warning notifications. Korean Public Alert System (KPAS) and European Union (EU) Warning System both using the identical mechanism as the CMAS are defined.

Whether the above warning notifications can be received may be supported optionally for each terminal device.

A ETWS primary notification and/or a ETWS secondary notification can occur anytime. A paging message is used for notifying the presence (or absence) of the ETWS primary notification and the ETWS secondary notification to a terminal device in the idle mode and to a terminal in the connected mode, which are capable of operating the ETWS (supporting the ETWS). Upon receiving such a paging message including an ETWS indication, the terminal device initiates reception of the ETWS primary notification and/or the ETWS secondary notification in accordance with a scheduling information list included in the SIB 1. When the terminal device receives the paging message including the ETWS indication while capturing the ETWS notification, the terminal device keeps capturing the ETWS notification based on the schedule information list that has already been captured, until re-capturing the scheduling information list in the SIB 1. The segmentation may be applied to the transmission for the ETWS secondary notification. The segmentation is fixed for transmission for a given secondary notification in a cell. The ETWS secondary notification corresponds to one CB data IE.

A CMAS notification can occur anytime. A paging message is used for notifying the presence (or absence) of one or more CMAS notifications to the terminal device in the idle mode and to the terminal device in the connected mode, which are capable of operating the CMAS (supporting the CMAS). Upon receiving such a paging message including a CMAS indication, the terminal device initiates reception of the CMAS notification in accordance with the scheduling information list included in the SIB 1. When the terminal device receives the paging message including the CMAS indication while capturing the CMAS notification, the terminal device keeps capturing the CMAS notification based on the schedule information list that has already been captured, until re-capturing the scheduling information list in the SIB 1. The segmentation may be applied to the transmission for the CMAS notification. The segmentation is fixed for transmission for a given CMAS notification in a cell. The EUTRAN does not interleave transmission of the CMAS notification. That is, all segments in a given CMAS notification transmission are transmitted prior to transmissions of other CMAS notifications. Note that the CMAS notification corresponds to one CB data IE.

An EAB parameter change can occur anytime. The EAB parameter is included in a System Information Block type 14 (SIB 14). A paging message notifies the terminal device in the idle mode and the terminal device in the connected mode, which are capable of operating the EAB (supporting the EAB) of an EAB parameter change, or notifies that the SIB 14 is not scheduled. Upon receiving such a paging message including the EAB parameter change, the terminal device captures the SIB 14 in accordance with the scheduling information list included in the SIB 1. When the terminal device receives the paging message including the EAB parameter change, while capturing the SIB 14 including the EAB change, the terminal device keeps capturing the SIB 14 based on the schedule information list that has already been captured, until re-capturing the scheduling information list in the SIB 1. Note that it is not expected for the terminal device capable of operating the EAB to periodically check the scheduling information list included in the SIB 1.

In the connected mode, the network (the base station device) controls the mobility of terminal devices. That is, the network determines when a terminal device is connected to which one of EUTRA cells or inter-RAT cells. Regarding the network-controlled mobility in the connected mode, a PCell can be changed by using an RRC connection reconfiguration message including mobility control information, whereas the SCell can be changed by using the RRC connection reconfiguration message regardless of the presence or absence of the mobility control information.

The network, for example, triggers a handover procedure based on a radio condition or a load. The network may configure the terminal device to perform a measurement report including the configuration of a measurement gap. The network may initiate handover anytime even without the measurement report to be received from the terminal device.

A source base station device (source eNB) makes one or more target cells accessible before transmitting a handover message to the terminal device. The source base station device may provide a target base station device (a base station device for handover) along with a list of best cells in each frequency in which measurement information is valid. The target base station device may include the measurement information valid for the cells provided in the list. The target base station device determines which SCell is configured for specifications after the handover, and the determined cell may include a cell other than a cell indicated by the source base station device.

The target base station device generates a message to be used for the handover. Such a message includes an Access Stratum Configuration (AS configuration) to be used in a target cell. The source base station device transfers a handover message/information that has been received from the target base station device, to the terminal device transparently (without changing a value or information). The source base station device may initiate data transfer to a DRB in an appropriate case (in a case of allocation at an appropriate time).

After receiving the handover message, the terminal device attempts to access the target PCell in a first RACH occasion that is valid, based on a random access resource selection. In this case, the handover may be asynchronous. In a case where a dedicated preamble for a random access in the target PCell is allocated, the EUTRA ensures the validity of the dedicated preamble from the first RACH occasion that can be used by the terminal device. The terminal device transmits a message to be used for permitting the handover at the normal completion of the handover. That is, the terminal device, upon successful completion of the handover procedure, transmits a message indicating the handover procedure completion (handover is completed).

In a case where the target base station device does not support the release of the RRC protocol used by the source base station device for configuring the terminal device, the target base station device may not be capable of learning the configuration of the terminal device that has been provided by the source base station device. In this case, the target base station device utilizes all configuration options to reconfigure the terminal device for the handover and re-establishment. All configuration options include initialization of the radio configurations, and a procedure separate from the configuration used in a source cell is performed except that a security algorithm is continuing for the RRC re-establishment.

The PBCH is allocated to six RBs (i.e., 72 REs) at the center of a downlink bandwidth configuration in the frequency domain, and is allocated to indexes (OFDM symbol indexes) 0 to 3 in slot 1 (the second slot in the subframe, a slot index 1) of a subframe 0 (the first subframe in the radio frames, a subframe index 0) in the time domain. Note that the downlink bandwidth configuration is represented by a multiple of the resource block size, in the frequency domain, expressed as the number of subcarriers. Furthermore, the downlink bandwidth configuration is a downlink transmission bandwidth configured in a given cell. That is, the PBCH is transmitted by using six RBs at the center of the downlink transmission bandwidth.

The PBCH is not transmitted using a resource reserved for a DLRS. That is, the PBCH is mapped with avoiding a DLRS resource. Regardless of the actual configuration, the PBCH is mapped by assuming CRSs for existing antenna ports 0 to 3. Furthermore, resource elements of the CRSs for the antenna ports 0 to 3 are not used for PDSCH transmission.

As broadcast information, a Cell Global Identifier (CGI) indicating a cell-specific identifier, a Tracking Area Identifier (TAI) for managing a standby area by paging, random access configuration information (such as a transmission timing timer), shared radio resource configuration information, neighboring cell information, and uplink access restriction information on the cell are notified.

The DownLink Reference Signal (DLRS) is classified into multiple types according its use. For example, a CRS is a pilot signal transmitted with predefined power in each cell, and is a downlink reference signal periodically repeated in the frequency domain and in the time domain, based on a predefined rule. The terminal device receives the CRS to measure a reception quality (Reference Signal Received Power (RSRP), Reference Signal Received Quality (RSRQ)) for each cell. The terminal device also uses the CRS as a reference signal for demodulation of a PDCCH or a PDSCH transmitted concurrently with the CRS. The sequence used for the CRS is distinguishable among the cells.

The DLRS is also used for estimation (channel estimation) of a downlink channel variation. The DLRS used for estimation of a channel variation is referred to as a Channel State Information Reference Signal (CSI-RS). Furthermore, a DLRS individually configured for each terminal device is referred to as "UERS", "DMRS", or "Dedicated RS", and is referenced for a channel compensation process on a channel, when an Enhanced PDCCH (EPDCCH) or a PDSCH is demodulated.

The Channel State Information (CSI) includes a Channel Quality Indicator (CQI), a Precoding Matrix Indicator (PMI), a Precoding Type Indicator (PTI), and a Rank Indicator (RI), which can be used for respectively specifying (representing) a suitable modulation scheme and coding rate, a suitable precoding matrix, a suitable PMI type, and a suitable rank. Note that each of the indicators may be denoted as an indication. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, the PMI include a normal type of PMI indicating a single suitable precoding matrix with a single PMI, and another type of PMI indicating a single suitable precoding matrix with two kinds of PMIs, which are a first PMI and a second PMI. Note that the CSI is reported on a PUCCH and a PUSCH.

The Physical Downlink Control CHannel (PDCCH) is transmitted using several OFDM symbols (e.g., 1 to 4 OFDM symbols) from the beginning of each subframe. The Enhanced Physical Downlink Control CHannel (EPDCCH)

is a PDCCH allocated in OFDM symbols, in which a PDSCH is allocated. The PDCCH or EPDCCH is used to notify the terminal device of radio resource allocation information in accordance with scheduling determined by the base station device, information indicating an adjustment quantity for an increase or decrease in the transmit power, and other control information. That is, the PDCCH/EPDCCH is used to transmit DCI (or a DCI format including at least one piece of DCI). In each embodiment of the present invention, in a case where the PDCCH is simply described, both physical channels that are the PDCCH and the EPDCCH are included, unless otherwise specified.

The PDCCH is used to notify a terminal device (UE) and a relay station device (RN) of information on resource allocations of a Paging CHannel (PCH) and DL-SCH, and HARQ information on the DL-SCH (DL HARQ). The PDCCH is also used to transmit an uplink scheduling grant and a sidelink scheduling grant. That is, the PDCCH is used for transmitting a DCI (a resource allocation for the PDSCH) indicating resource allocations for the PCH and/or the DL-SCH, and a DCI indicating a HARQ-ACK for the PCH and/or the DL-SCH. The terminal device detects the PDSCH, to which the PCH or the DL-SCH is mapped, based on these DCIs.

The DCI indicating the resource allocations of the PCH and/or the DL-SCH may include information related to the resource allocation/information related to a virtual resource allocation (information related to the resource block allocation) of the PDSCH, and information related to the number of the antenna ports or layers of a UERS or a DMRS, which is used for demodulating the PDSCH.

The DCI indicating the HARQ-ACK for the PCH and/or the DL-SCH may include: information related to a modulation and coding scheme; information indicating either initial transmission or retransmission of the PCH or the DL-SCH transport block; information indicating a start point (an initiating point for loading stored data (HARQ soft buffer)) in a circular buffer (Redundancy Version); information related to a Downlink Assignment Index (DAI) used for a HARQ-ACK procedure in TDD, in which a possibility of a HARQ protocol error such as an ACK transmission failure or a PDCCH detection failure (information related to a HARQ-ACK subframe for the PUSCH (the UL-SCH); and information related to a HARQ-ACK subframe for the PDSCH (the PCH or the DL-SCH)).

The EPDCCH is used to notify the terminal device (UE) of the DL-SCH resource allocation and the HARQ information on the DL-SCH. The EPDCCH is also used to transmit the uplink scheduling grant and the sidelink scheduling grant.

The PDCCH is transmitted with an aggregation of one or several consecutive Control Channel Elements (CCEs). Note that a single CCE corresponds to nine Resource Element Groups (REGs). The number of CCEs available in a system is determined except for a Physical Control Format Indicator CHannel (PCFICH) and a Physical HARQ Indicator CHannel (PHICH). The PDCCH supports multiple formats (PDCCH formats). For each PDCCH format, the number of CCEs, the number of REGs, and the number of PDCCH bits are defined. A single REG is constituted of four REs. That is, one PRB may include up to three REGs. The PDCCH format is determined depending on the size of the DCI format, and the like.

Since the multiple PDCCHs are mapped throughout downlink transmission bandwidth, after all the multiple PDCCHs are subject to the modulation and coding process, a terminal device keeps on decoding until such a terminal device detects the PDCCH addressed to the terminal device itself. That is, the terminal device can not detect the PDCCH, even in a case of receiving only a part of the frequency domain and demodulating and decoding the received frequency domain. The terminal device becomes capable of correctly detecting the PDCCH (a PDCCH candidate) addressed to the terminal device itself, only after receiving the entire PDCCHs mapped to the whole downlink transmission bandwidth.

Multiple PDCCHs may be transmitted in a single subframe. Moreover, the PDCCH is transmitted through the same set of antenna ports as that for the PBCH. The EPDCCH is transmitted through an antenna port different from that for the PDCCH.

The terminal device monitors a PDCCH addressed to the terminal device itself and receives the PDCCH addressed to the terminal device itself, before transmitting and receiving downlink data or a layer-2 message and a layer-3 message, which are higher-layer control information (such as a paging or a handover command), and acquires, from the PDCCH, radio resource allocation information that is named an uplink grant in a case of transmission and a downlink grant (downlink assignment) in a case of reception. Note that the PDCCH can be configured to be transmitted in a region of resource blocks to be allocated by the base station device individually to the terminal device, in addition to being transmitted in the OFDM symbols described above.

The DCI is transmitted in a specific format. The uplink grant and the downlink grant are transmitted in different formats. For example, the terminal device can acquire the uplink grant from a DCI format 0, and can acquire the downlink grant from a DCI format 1A. In addition, other DCI formats include a DCI format containing only a DCI indicating a transmit power control command for the PUSCH or the PUCCH (a DCI format 3/3A), a DCI format containing a DCI indicating a UL-DL configuration (a DCI format 1C), and the like. For example, the radio resource allocation information for the PUSCH and the PDSCH is one type of DCIs.

The terminal device can configure various parameters of corresponding uplink signals and downlink signals, based on the detected DCI (a value set in the detected DCI), and can perform transmission and reception. For example, when the terminal device detects a DCI related to a PUSCH resource allocation, the terminal device can allocate the PUSCH resource based on the detected DCI, and can transmit the PUSCH. When the terminal device detects a transmit power control command (TPC command) for the PUSCH, the terminal device can adjust the transmit power of the PUSCH, based on the detected DCI. When the terminal device detects a DCI on PDSCH resource allocation, the terminal device can receive the PDSCH from a resource indicated, based on the detected DCI.

The terminal device can acquire (determining) various DCIs (DCI formats), by decoding a PDCCH along with a Cyclic Redundancy Check (CRC) scrambled with a specific Radio Network Temporary Identifier (RNTI). A higher layer configures which PDCCH along with the CRC scrambled with which RNTI is to be decoded.

Control information transmitted on a DL-SCH or a PCH corresponding to the PDCCH differs depending on with which RNTI the PDCCH is scrambled. For example, in a case where a PDCCH is scrambled with a Paging RNTI (P-RNTI), information on the paging is transmitted on the PCH. In a case where a PDCCH is scrambled with a system information RNTI (SI-RNTI), system information may be transmitted on such a DL-SCH.

Moreover, the DCI format is mapped to a search space (Common Search Space (CSS), UE-specific Search Space (UESS)) given by a specific RNTI. Furthermore, the search space is defined as a set of PDCCH candidates to be monitored. That is, in each embodiment of the present invention, monitoring a search space is used synonymously with monitoring a PDCCH. Note that the CSS and the UESS in the PCell sometimes overlap each other. In the EPDCCH, only the UESS may be defined.

The PHICH is used to transmit an HARQ-ACK/NACK (NAK) in response to uplink transmission.

The PCFICH is used to notify the terminal device and the relay station device of the number of OFDM symbols used for the PDCCH. Furthermore, the PCFICH is transmitted in each downlink subframe or in each special subframe.

The Physical Downlink Shared CHannel (PDSCH) is used to notify the terminal device of not only downlink data (DL-SCH data, a DL-SCH transport block) but also broadcast information (system information) that is not notified on the PCH, the paging, or the PBCH, as a layer-3 message. The radio resource allocation information on the PDSCH is indicated with the PDCCH. The PDSCH is allocated in an OFDM symbol different from an OFDM symbol in which the PDCCH is transmitted. That is, the PDSCH and the PDCCH are subjected to Time Division Multiplexing (TDM) within a single subframe. However, the PDSCH and the EPDCCH are subjected to Frequency Division Multiplexing (FDM) within a single subframe.

The PDSCH may also be used to broadcast the system control information.

The PDSCH may also be used as paging, in a case where the network does not learn a cell in which the terminal device is located. That is, the PDSCH may be used to transmit paging information and modification notification of system information.

Moreover, the PDSCH may be used to transmit control information between a terminal device and the network, to such a terminal device having no RRC connection with the network (the terminal device in the idle mode).

The PDSCH may also be used to transmit dedicated control information between a terminal device and the network, to such a terminal device having an RRC connection (the terminal device in the connected mode).

The PDSCH is used for transmitting a transport block corresponding to the RNTI added to the PDCCH. For example, the DL-SCH associated with the random access response is mapped to the PDSCH, in which the resource allocation is indicated by the PDCCH along with the CRC scrambled with the RA-RNTI. Further, the PCH associated with the paging information is mapped to the PDSCH, in which the resource allocation is indicated by the PDCCH along with the CRC scrambled with the P-RNTI. Further, the DL-SCH associated with the SIB is mapped to the PDSCH, in which the resource allocation is indicated by the PDCCH along with the CRC scrambled with the SI-RNTI. Further, the DL-SCH associated with the RRC message may be mapped to the PDSCH, in which the resource allocation is indicated by the PDCCH along with the CRC scrambled with the temporary C-RNTI.

The Physical Uplink Control CHannel (PUCCH) is used to make a reception confirmation acknowledgment (Hybrid Automatic Repeat reQuest-ACKnowledgment (HARQ-ACK) or Acknowledgment/Negative Acknowledgment (ACK/NACK or ACK/NAK)) for downlink data transmitted on the PDSCH, a downlink channel (Channel State) Information (CSI) report, and an uplink radio resource allocation request (radio resource request, Scheduling Request (SR)). That is, the PUCCH is used to transmit the HARQ-ACK/NACK, the SR, or the CSI report in response to downlink transmission. For the PUCCH, multiple formats are supported according to the type of Uplink Control Information (UCI) such as the HARQ-ACK, the CSI, and the SR to be transmitted. For the PUCCH, a resource allocation method and a transmit power control method are defined for each format. The PUCCH uses one RB in each of two slots of one subframe. That is, the PUCCH includes one RB regardless of the format. Furthermore, the PUCCH may not be transmitted in an UpPTS of the special subframe.

When the PUCCH is transmitted in an SRS subframe, in a PUCCH format to which a shortened format is applied (e.g., formats 1, 1a, 1b, and 3), the last one symbol or two symbols, to which an SRS may possibly be allocated (the last one symbol or two symbols of the second slot in the subframe), is or are to be made empty.

One RB in each slot may support a combination of PUCCH formats 1/1a/1b and PUCCH formats 2/2a/2b. That is, the terminal device may transmit the PUCCH formats 1/1a/1b and the PUCCH formats 2/2a/2b in one RB.

In a case where the number of repetitions is configured for the PUCCH, a pseudo-random sequence generator may not necessarily be initialized with an initial value, until the repeated transmission of the PUCCH is completed.

The Physical Uplink Shared CHannel (PUSCH) mainly transmits uplink data (UL-SCH data, a UL-SCH transport block) and control data, and may include Uplink Control Information (UCI), such as CSI, an ACK/NACK (HARQ-ACK), and an SR. Moreover, the physical uplink shared channel is also used such that the terminal device notifies the base station device of uplink data as well as a layer-2 message and a layer-3 message, which are higher-layer control information. In addition, in a similar manner to downlink, the radio resource allocation information on the PUSCH is indicated with the PDCCH (PDCCH along with a DCI format). In a case where the PUSCH is transmitted in an SRS subframe and a PUSCH resource overlaps an SRS bandwidth, the last one symbol or the last two symbols, to which the SRS may possibly be allocated (the last one symbol or two symbols of the second slot of the subframe), is or are to be made empty.

In a case where the number of repetitions is configured for the PUSCH, a scrambling sequence generator may not necessarily be initialized with an initial value, until the repeated transmission of the PUSCH is completed.

An uplink reference signal (an uplink pilot signal, an uplink pilot channel, or a ULRS) includes a Demodulation Reference Signal (DMRS) to be used by the base station device to demodulate the PUCCH and/or the PUSCH, and a Sounding Reference Signal (SRS) to be mainly used by the base station device to estimate an uplink channel state. Moreover, the SRS includes a Periodic Sounding Reference Signal (P-SRS), which is transmitted periodically, and an Aperiodic Sounding Reference Signal (A-SRS), which is transmitted when the base station device indicates. Note that the P-SRS is referred to as a trigger type 0 SRS, and the A-SRS is referred to as a trigger type 1 SRS. The SRS is allocated to the last one symbol or the last two symbols in a subframe. The subframe in which the SRS is transmitted may be referred to as an SRS subframe. The SRS subframe is determined based on a cell-specific subframe configuration and a terminal device-specific subframe configuration. To transmit the PUSCH in a subframe in which a cell-specific subframe configuration is set, none of the terminal devices in a cell allocates a PUSCH resource to the last symbol in the subframe. To transmit the PUCCH, to which a shortened format is applied, none of the terminal devices in a cell allocates a PUCCH resource in the last symbol in a subframe, in which a cell-specific subframe configuration is set. However, the shortened format may not be applied depending on the PUCCH format. In such a case, the PUCCH may be transmitted in a normal format (i.e., transmitted with a PUCCH resource allocated to an SRS symbol). To transmit the PRACH, its transmission has a higher priority. When an SRS symbol is arranged in a guard time of the PRACH, the SRS may be transmitted.

The Physical Random Access CHannel (PRACH) serves as a channel that is used to notify (configure) a preamble sequence, and includes a guard time. The preamble sequence is configured such that multiple sequences are sued for notifying information to the base station device. For example, with 64 sequences that are available, 6-bit information can be provided to the base station device. The PRACH is used by the terminal device as an access means to access the base station device (such as an initial access). The PRACH is used to transmit a random access preamble.

The terminal device uses the PRACH to request an uplink radio resource when no PUCCH is configured for an SR or to request the base station device for transmission timing adjustment information (also referred to as a Timing Advance (TA) command) demanded for matching the uplink transmission timing with a reception timing window of the base station device, for example. Moreover, the base station device can also request the terminal device to initiate a random access procedure with a PDCCH (referred to as a PDCCH order).

The layer-3 message serves as a message exchanged between the Radio Resource Control (RRC) layers of the terminal device and the base station device and handled in a protocol for a Control-Plane (CP, C-Plane), and may be used synonymously with RRC signaling or an RRC message. Note that in contrast to the CP, a protocol handling user data (uplink data and downlink data) is referred to as a User-Plane (UP, U-Plane). Here, a transport block that is transmission data in the physical layer includes C-Plane messages and U-Plane data in higher layers. That is, in each embodiment of the present invention, data and transport block are synonymously used. Detailed descriptions of other physical channels are omitted.

A communicable range (communication area) at each frequency controlled by a base station device is regarded as a cell. Here, the communication area covered by the base station device may be different in size and shape for each frequency. Moreover, the covered area may be different for each frequency. A radio network, in which cells having different types of base station devices or different cell radii are located in a mixed manner in the area with the same frequency and/or different frequencies to form a single communication system, is referred to as a heterogeneous network.

A terminal device has no connection with any network, for example, immediately after being powered on (e.g., upon activation). Such a state with no connection is referred to as an idle mode (RRC_IDLE). To perform communication, the terminal device in the idle mode needs to establish a connection with any network. That is, the terminal device needs to be in the connected mode (RRC_CONNECTED). Here, a network may include a base station device, an access point, a network server, a modem, and the like that belong to the network.

Then, to perform communication, the terminal device in the idle mode needs to perform a Public Land Mobile Network (PLMN) selection, a cell selection/re-selection, a location registration, and a manual selection of a Closed Subscriber Group (CSG) cell, for example.

When the terminal device is powered on, a PLMN is selected by a Non-Access Stratum (NAS). For the selected PLMN, an associated Radio Access Technology (RAT) is set. The NAS provides a list of corresponding PLMNs, if available, so that an access stratum uses the list for a cell selection/re-selection.

In the cell selection, the terminal device searches for a suitable cell in the selected PLMN, and selects a cell (a serving cell) that provides available services. Furthermore, the terminal device tunes to its control channel. Such a selection is referred to as camp on a cell.

The terminal device, when necessary, registers its presence (information on a selected cell or information on a tracking area) in the tracking area of the selected cell, as an outcome of a successful location registration by which the selected PLMN becomes a registered PLMN.

When finding a more suitable cell, the terminal device re-selects the cell according to cell re-selection criteria, and camps on the cell. Unless a new cell is included in at least one tracking area in which the terminal device is registered, a location registration for the new cell is performed.

When necessary, the terminal device searches for a PLMN with a higher priority at regular time intervals, and searches for a suitable cell when another PLMN is selected by the NAS.

Searching for available CSGs may be triggered by the NAS to support a manual CSG selection.

When being out of a coverage area of the registered PLMN, the terminal device may allow a user to configure either automatic selection (automatic mode) of a new PLMN or manual selection (manual mode) of manually selecting which PLMNs are available. However, for receiving a service that does not need a registration, the terminal device may not necessarily perform such a registration.

The following (A1) to (A5) can be mentioned as purposes of a terminal device in an idle mode to camp on a cell.

(A1) The terminal device is enabled to receive system information from a PLMN (or EUTRAN).

(A2) When the terminal device is registered and attempts to establish an RRC connection, the terminal device performs an initial access to the network using the control channel of the cell on which the terminal device camps.

(A3) When the PLMN receives a call for the registered terminal device, the PLMN learns a set of tracking areas on which the terminal device camps (i.e., camped cells). The PLMN then can transmit a paging message to the terminal device on control channels of all the cells in such a set of tracking areas. Then, since the terminal device then tunes to the control channel of one of the cells in the registered tracking areas, the terminal device is capable of receiving the paging message and responding to the control channel.

(A4) The terminal device is enabled to receive notifications of Earthquake and Tsunami Warning System (ETWS) and Commercial Mobile Alter System (CMAS).

(A5) The terminal device is enabled to receive Multimedia Broadcast-Multicast Services (MBMSs).

When the terminal device is unable to find a suitable cell to camp on or the location registration fails, the terminal device attempts to camp on a cell, regardless of the PLMN identity, and becomes a "limited service" state. Here, a limited service includes an emergency call, the ETWS, and the CMAS, in a cell satisfying a certain condition. On the other hand, a normal service is provided for public use in a suitable cell. An operator-specific service and the like are also provided.

When the NAS indicates the start of a Power Saving Mode (PSM), an Access Stratum (AS) configuration is maintained and all the timers in operation continue to operate, but the terminal device may not perform an idle mode task (e.g., a PLMN selection, a cell selection/re-selection, and the like). When a certain timer expires with the terminal device being in the PSM, whether the last process at the end of the PSM is to be performed or a corresponding process is to be immediately performed depends on an implementation of the terminal device. When the NAS indicates the end of the PSM, the terminal device performs all the idle mode tasks.

The terminal device operates by regarding the inside of a cell as a communication area. When the terminal device moves from a cell to another cell, the terminal device moves to another suitable cell through a cell selection/re-selection procedure at the time of having no connection (in RRC_IDLE, in an idle mode, in no communication) or through a handover procedure at the time of having a connection (in RRC_CONNECTED, in a connected mode, in communication). A suitable cell in general indicates a cell that is determined that access from the terminal device is not prohibited based on information specified by the base station device, and that has a downlink reception quality satisfying a predefined condition.

In a PLMN selection, the terminal device reports available PLMNs to the NAS, in accordance with a request from the NAS or autonomously. During the PLMN selection, a specific PLMN can be selected either automatically or manually, based on a list of PLMN identities in priority. Each PLMN in the list of PLMN identities is identified by a PLMN identity. In system information on a broadcast channel, the terminal device can receive one or more PLMN identities in a given cell. The PLMN selection performed by the NAS results in an identity of the selected PLMN.

In response to the request from the NAS, the AS searches for available PLMNs and reports the available PLMNs to the NAS.

For the EUTRA, to find available PLMNs, the terminal device scans all RF channels in a EUTRA operating band corresponding to the capability information on the terminal device. In each carrier (component carrier), the terminal device searches for the strongest cell and reads the system information to find a PLMN, to which the cell belongs. The terminal device can read one or some PLMN identities in the strongest cell, and each PLMN that has been found is reported to the NAS, as a PLMN having a higher quality. Note that a criterion for the PLMN having a higher quality includes a case where an RSRP value measured of an EUTRA cell is equal to or higher than a predefined value (e.g., −110 dBm). Here, the strongest cell means, a cell indicating the best (highest) value in the measurement value of RSRP or RSRQ, for example. That is, the strongest cell can be a most suitable cell in the communication of the terminal device.

Although the PLMN that has been found does not satisfy the criterion, when readable, a PLMN identity is reported together with an RSRP value to the NAS. The measurement values reported to the NAS are the same as each PLMN found in a single cell.

Search for PLMNs can be stopped by a request from the NAS. The terminal device may optimize the PLMN search by using the stored information (e.g., information on a carrier frequency and cell parameter from reception measurement control information elements, and the like).

Once the terminal device selects a PLMN, the cell selection procedure is performed to select a suitable cell, of the PLMN, on which the terminal device camps.

In a case where a CSG-ID is provided by the NAS, as a part of the PLMN selection, the terminal device searches for an acceptable or suitable cell belonging to the provided CSG-ID to camp on the cell. When the terminal device no longer camps on a cell of the provided CSG-ID, the AS informs the NAS of such information.

In the cell selection/re-selection, the terminal device performs measurements for the cell selection/re-selection.

The NAS can control the RAT in which the cell selection is performed, by indicating the RAT associated with the selected PLMN or by maintaining a list of prohibited registration areas and a list of equivalent PLMNs, for example. The terminal device selects a suitable cell, based on idle mode measurements and the cell selection criterion.

To accelerate the cell selection process, the information stored for some RATs may be utilized in the terminal device.

When a terminal device camps on a cell, the terminal device searches for a better cell according to the cell re-selection criterion. When a better cell is found, such a cell is selected. A cell change may imply a change of a RAT. Here, a better cell denotes a cell more suitable for communication. For example, the better cell means a cell having a higher communication quality (e.g., good results in measurement values of RSRP and RSRQ).

When the cell selection/re-selection is changed in the received system information on the NAS, information is supplied to the NAS.

In a normal service, the terminal device camps on a suitable cell and tunes to the control channel of the cell. This allows the terminal device to receive the system information from the PLMN. Furthermore, the terminal device can receive, from the PLMN, registration area information such as tracking area information. Furthermore, the terminal device can receive NAS information from another AS. After the registration, the terminal device can receive the paging and notification messages from the PLMN. Moreover, the terminal device can initiate a transition to the connected mode.

The terminal device uses one of the two cell selection procedures. Initial cell selection demands no preliminary knowledge (stored information) that an RF channel serves as an EUTRA carrier. To find a suitable cell, the terminal device scans all RF channels in the EUTRA operating bands in accordance with the capability information on the terminal device. On each carrier frequency, the terminal device demands only searching for the strongest cell. As soon as a suitable cell is found, such a cell is selected.

Stored information cell selection needs stored information on a carrier frequency from previously received measurement control information elements or from previously detected cells, and optionally further needs information on a cell parameter. As soon as the terminal device finds a suitable cell, the terminal device selects such a cell. When no suitable cell is found, the initial cell selection procedure is started.

In addition to the normal cell selection, a manual selection of CSGs is supported by the terminal device, in accordance with a request from a higher layer.

Clear priorities of different EUTRAN frequencies or inter-RAT frequencies may be provided to the terminal device in the system information (e.g., an RRC connection release message), or by inheriting from another RAT at inter-RAT cell (re)selection. In the case of system information, a EUTRAN frequency or an inter-RAT frequency is listed without the provision of a priority.

When the priorities are provided in dedicated signaling, the terminal device ignores all the priorities provided in the system information. When the terminal device is in a state of camping on any cell, the terminal device only applies the priorities provided in the system information from a current cell (currently connected cell). The terminal device holds the priorities provided by the dedicated signaling or by the RRC connection release message, unless otherwise specified.

The terminal device in the idle mode can synchronize time and frequency of a cell with the PSS/SSS, and can decode the PSS/SSS to acquire a cell ID of the cell. The terminal device can estimate a frequency position of the CRS by using the cell ID, and can perform an RSRP/RSRQ measurement.

Note that EUTRAN measurements include a measurement by the terminal device in the connected mode. The terminal device performs the EUTRAN measurements at a proper measurement gap and is in synchronization with the cell in which the EUTRAN measurements are performed. The EUTRAN measurements include an intra-frequency RSRP/RSRQ, an inter-frequency RSRP/RSRQ, a time difference between reception and transmission by the terminal device, a time difference between reference signals (RSTD), signals used for positioning of the terminal device, an inter-RAT (EUTRAN-GERAN/UTRAN) measurement, and an inter-system (EUTRAN-non 3GPP RAT) measurement. The EUTRAN measurements are defined as a physical layer measurement. The EUTRAN measurements are used for supporting the mobility.

The terminal device in the idle mode and the terminal device in the connected mode performs a cell search and captures time and frequency synchronization with a cell to detect a PCI of the cell. The EUTRA cell search supports transmission bandwidth capable of enhancing to correspond to 6 resource blocks or more.

The PSS/SSS is transmitted in the downlink for the cell search. That is, the terminal device performs the cell search using the PSS/SSS. The terminal device assumes that antenna ports 0 to 3 and the PSS/SSS in the serving cell are Quasi Co-Located to a Doppler shift and average delay.

The neighboring cell search is, as an initial cell search, based on the identical downlink signal.

The RSRP measurement is performed based on a CSI-RS of the CRS or on the configured DS (Discovery Signal).

In a case where the terminal device in a normal camping state has an individual priority other than the priority for the current frequency, the terminal device regards the current frequency as a lower priority frequency (i.e., lower than any of the configured values of 8 networks).

While the terminal device is camping on a suitable CSG cell, the terminal device always regards the current frequency as a higher priority frequency (i.e., higher than any of the configured values of 8 networks) regardless of any other priority values allocated to the current frequency.

When the terminal device becomes the RRC_CONNECTED state, when a timer (T320) for an optional validity time of a dedicated priority expires, or when a PLMN selection is performed by request from the NAS, the terminal device deletes the priority provided by the dedicated signaling.

The terminal device simply performs a cell re-selection estimation on EUTRAN frequencies or inter-RAT frequencies that are given in the system information and for which the terminal device has a provided priority.

The terminal device does not consider any blacklisted cell as a candidate for a cell re-selection.

The terminal device succeeds the priorities provided by the dedicated signaling and the continuing validity time.

In a case where the terminal device supports a manual CSG selection, the AS scans all RF channels in the EUTRA operating bands corresponding to the capability information to search for available CSGs in response to a request from the NAS. On each carrier, the terminal device searches for the strongest cell at least, reads the system information of the cell, and reports, to the NAS, an available CSG-ID together with the PLMN and a "Home Node B (HNB) name" (if broadcast).

In a case where the NAS selects a CSG and provides such a selection to the AS, the terminal device searches for an acceptable or suitable cell satisfying a condition for belonging to the selected CSG to camp on.

In addition to the normal cell re-selection, in a case where at least one CSG-ID associated with a PLMN identity is included in a CSG whitelist of the terminal device, the terminal device may use an autonomous search function in accordance with performance requirements to detect at least previously visited (accessed) CSG member cells on non-serving frequencies and inter-RAT frequencies. To search for cells, the terminal device may further use an autonomous search function on the serving frequency. When the CSG whitelist of the terminal device is empty, the terminal device disables the autonomous search function for CSG cells. Here, the autonomous search function on each terminal device implementation determines when and where to search for CSG member cells.

When the terminal device detects one or more suitable CSG cells on different frequencies and the related CSG cell is the highest ranked cell on that frequency, the terminal device re-selects one of the detected cells irrespective of the frequency priority of the cell on which the terminal device is currently camping.

When the terminal device detects a suitable CSG cell on the same frequency, the terminal device re-selects such a cell in accordance with the normal cell re-selection rule.

When the terminal device detects one or more CSG cells on another RAT, the terminal device re-selects one of those cells in accordance with a specific rule.

While camping on a suitable CSG cell, the terminal device applies the normal cell re-selection.

To search for suitable CSG cells on non-serving frequencies, the terminal device may use the autonomous search function. When the terminal device detects a CSG cell on a non-serving frequency and the detected CSG cell is the highest ranked cell on the frequency, the terminal device may re-select the detected CSG cell.

When the terminal device detects one or more CSG cells on another RAT and such one or more CSG cells are allowed in accordance with a specific rule, the terminal device may re-select one of those CSG cells.

In addition to normal cell re-selection rules, the terminal device uses the autonomous search function for detecting at least a previously visited hybrid cell included in the CSG whitelist, in which a CSG ID and an associated PLMN identity meet performance requirements. The terminal device treats the detected hybrid cell as a CSG cell, in a case where the CSG ID and the associated PLMN identity of the hybrid cell are included in the CSG whitelist, and also treats other cells as normal cells.

In the normally camping state, the terminal device performs the following tasks (B1) to (B4).

(B1) The terminal device selects and monitors an indicated paging channel of the cell in accordance with the information transmitted in the system information.

(B2) The terminal device monitors relevant system information.

(B3) The terminal device performs necessary measurements for a cell re-selection estimation procedure.

(B4) The terminal device performs the cell re-selection estimation procedure, in accordance with an internal trigger of the terminal device and/or when information on the Broadcast Control CHannel (BCCH) used for the cell re-selection estimation procedure is modified.

After a transition from the connected mode to the idle mode, in a case where information on a redirected carrier (redirectedCarrierInfo) is included in an RRC connection release message, the terminal device attempts to camp on a suitable cell in accordance with the information. When the terminal device fails to find a suitable cell, the terminal device is allowed to camp on any suitable cell of the indicated RAT. Unless the RRC connection release message includes the information on the redirected carrier, the terminal device attempts to select a suitable cell on a EUTRA carrier. When no suitable cell is found, the terminal device starts a cell selection by using the stored information cell selection procedure to search for a suitable cell to camp on.

After the terminal device transitions to a connected mode from a state of camping on any cell and the terminal device is re-adjusted to an idle mode, when the information relating to a redirected carrier is included in the RRC connection release message, the terminal device attempts to camp on an acceptable cell in accordance with the information on such a redirected carrier. Unless the RRC connection release message includes the information on the redirected carrier, the terminal device attempts to select an acceptable cell on the EUTRA carrier. When the terminal device fails to find an acceptable cell, the terminal device is continuously searching for an acceptable cell of any PLMN, in any one of cell selection states. In any one of the cell selection states, the terminal device that is not camping on any cell stay in this state until the terminal device finds an acceptable cell.

In a state of camping on any cell, the terminal device performs the following tasks (C1) to (C6).

(C1) In accordance with the information transmitted in the system information, the terminal device selects and monitors an indicated paging channel of the cell.

(C2) The terminal device monitors relevant system information.

(C3) The terminal device performs necessary measurements for the cell re-selection estimation procedure.

(C4) The terminal device performs the cell re-selection estimation procedure on an internal trigger of the terminal device and/or when information on the BCCH used for the cell re-selection estimation procedure have been modified.

(C5) The terminal device regularly tries all the frequencies of all RATs supported by the terminal device to find a suitable cell. When a suitable cell is found, the terminal device transitions to the normally camping state.

(C6) In a case where the terminal device supports a voice service, but the current cell does not support an emergency call as indicated by the system information, and no suitable cell is found, the terminal device performs a cell selection/re-selection to an acceptable cell of any supported RAT, regardless of the priorities provided in the system information from the current cell.

To prevent camping on a cell in which the terminal device is not capable of starting an IP Multimedia Subsystem (IMS) emergency call, the terminal device allows not to perform a re-selection of an EUTRAN cell within the frequency.

After the terminal device performs a PLMN selection and a cell selection, the terminal device camps on the cell. Accordingly, the terminal device becomes capable of receiving paging information and system information such as an MIB and an SIB 1, regardless of the state of the terminal device (an RRC idle (idle mode), an RRC connection (connected mode)). By performing random access, the terminal device can transmit an RRC connection request.

In the random access procedure in the terminal device in the idle mode, a higher layer (L2/L3) instructs random access preamble transmission. A physical layer (L1) transmits the random access preamble in accordance with the instruction. In the L1, ACK, which is a random access response, is received from a base station device. L2/L3 receives the instruction from the L1, and then the L2/L3 instructs the L1 to transmit an RRC connection request. The terminal device transmits, to the base station device (a cell on which the terminal device camps, EUTRAN, PLMN), an RRC connection request (PUSCH corresponding to a UL-SCH to which an RRC message associated with the RRC connection request is mapped). Upon receiving the RRC connection request, the base station device transmits, to the terminal device, an RRC connection setup (PDCCH and PDSCH associated with a DL-SCH to which an RRC message associated with the RRC connection set-up is mapped). Upon receiving the RRC connection setup on the L2/L3, the terminal device enters the connected mode. The L2/L3 of the terminal device instructs the L to transmit an RRC connection setup complete, and the procedure ends. The L1 transmits, to the base station device, the RRC connection setup complete (PUSCH corresponding to a UL-SCH to which an RRC message associated with the RRC connection set-up completion is mapped).

The MTC terminal in the idle mode may monitor the PDCCH in the downlink transmission bandwidth indicated by the MIB, until initial access of a random access procedure is completed, until an RRC connection is established, or until the support for MTC functions using a UL-SCH corresponding to random access response grant is indicated.

The MTC terminal in the idle mode may select a sequence indicating that the terminal is the MTC terminal, when performing initial access of the random access procedure, and may transmit a random access preamble of the sequence. Upon receiving the random access preamble, if the base station device allows access from the MTC terminal, the base station device may set a downlink resource allocation to the MTC terminal, in spare bits of the MIB. The MTC terminal detects, from the resource, a PDCCH corresponding to a random access response, completes the initial access, and establishes an initial RRC connection.

To reduce the power consumption, the terminal device in the idle mode may receive a paging message by utilizing Discontinuous Reception (DRX). Here, a Paging Occasion (PO) serves as a subframe including a P-RNTI, in which a PDCCH to address to a paging message is transmitted. A Paging Frame (PF) is a radio frame including one or multiple POs. While the DRX is being utilized, the terminal device needs to monitor one PO at every DRX cycle. The PO and PF are determined by using a DRX parameter provided in the system information. When a value of the DRX parameter is changed in the system information, a DRX parameter stored in the terminal device is updated locally. Unless the terminal device has an International Mobile Subscriber Identity (IMSI), for performing an emergency call without a Universal Subscriber Identity Module (USIM), the terminal device uses a default identifier (UE_ID=0) and i_s in the PF. That is, the paging information (PCH) is notified by using a PDCCH in a predefined subframe of a predefined radio frame.

The MTC terminal in the idle mode performs a PLMN re-selection and a cell re-selection in a case that the MTC terminal cannot detect information related to a PDCCH configuration for the MTC terminal or information related to the downlink resource allocation in the MIB or the SIB 1 (the SIB 1 corresponding to the MTC terminal). Further, the MTC terminal in the idle mode performs a PLMN re-selection and a cell re-selection in a case that the MTC terminal cannot detect the MIB or the SIB 1 (the SIB 1 corresponding to the MTC terminal) in a predetermined time (period).

The terminal device indicating category 0 can receive, in a single TTI, 1000 bits with respect to a transport block associated with a Cell RNTI (C-RNTI)/semi-persistent scheduling (SPS) C-RNTI/P-RNTI/SI-RNTI/Random Access RNTI (RA-RNTI). The terminal device indicating category 0 can also receive, in a single TTI, up to 2216 bits with respect to other transport blocks associated with a P-RNTI/SI-RNTI/RA-RNTI.

Requirement conditions for UE category 0 is caused by assuming the UE category 0 and a single antenna reception unit. These conditions are referred to as UE category 0 applicability.

The category 0 terminal monitors a downlink quality based on a CRS, to detect a downlink radio link quality of a PCell.

The category 0 terminal estimates the downlink radio link quality, and compares two threshold values ($Q_{out\_Cat0}$ and $Q_{in\_Cat0}$) and an estimated value, to monitor the downlink radio link quality of the PCell.

The threshold value $Q_{out\_Cat0}$ is defined as a level, at which the downlink radio link cannot be reliably received, corresponding to 10% block error rate of a hypothetical PDCCH transmission that is assumed in consideration of the PCFICH errors with transmission parameters.

The threshold value $Q_{in\_Cat0}$ is defined as a level, at which the downlink radio link can be reliably received as compared to the threshold value $Q_{out\_Cat0}$, corresponding to 2% block error rate of a hypothetical PDCCH transmission that is assumed in consideration of the PCFICH errors with transmission parameters.

For example, a PDCCH/PCFICH transmission parameter for out-of-synchronization (out-of-sync) with respect to the UE category 0 is determined in the DCI format 1A, and the number of OFDM symbols of the PDCCH is determined based on the bandwidth. When the bandwidth is equal to or greater than 10 MHz, the number of OFDM symbols is two symbols. When the bandwidth is equal to or greater than 3 MHz and less than 10 MHz, the number of OFDM symbols is three symbols. When the bandwidth is 1.4 MHz, the number of OFDM symbols is four symbols. An aggregation level of the PDCCH is 4 when the bandwidth is 1.4 MHz, and is 8 when the bandwidth is equal to or greater than 3 MHz. The ratio of RE energy (Energy Per Resource Element (EPRE)) of the PDCCH and average RE energy of an RS is 4 dB, irrespective of the number of CRS antenna ports of the PCell. The ratio of RE energy of the PCFICH and average RE energy of an RS is 4 dB in a case where the number of CRS antenna ports is one antenna port, and is 1 dB in a case where the number of CRS antenna ports of the PCell is two or four antenna ports.

For example, the PDCCH/PCFICH transmission parameter for in-synchronization (in-sync) with respect to the UE category 0 is determined in the DCI format 1C, and the number of OFDM symbols of PDCCH is determined based on the bandwidth. When the bandwidth is equal to or greater than 10 MHz, the number of OFDM symbols is two symbols. When the bandwidth is equal to or greater than 3 MHz and less than 10 MHz, the number of OFDM symbols is three symbols. When the bandwidth is 1.4 MHz, the number of OFDM symbols is four symbols. The aggregation level of the PDCCH is 4. The ratio of the RE energy of the PDCCH and average RE energy of the RS is 1 dB, irrespective of the number of CRS antenna ports. The ratio of the RE energy of the PCFICH and average RE energy of the RS is 4 dB when the number of CRS antenna ports of the PCell is one antenna port, and is 1 dB when the number of CRS antenna ports of the PCell is two or four antenna ports.

The terminal device camping on a cell captures time frequency synchronization from the PSS/SSS, and acquires the PCI. Subsequently, the terminal device detects a MIB on the PBCH and acquires the carrier frequency, the downlink transmission bandwidth, the SFN, and the PHICH configuration. By acquiring the MIB, the terminal device is enabled to monitor the PDCCH mapped to the whole downlink transmission bandwidth. In a case where the received PDCCH involves the CRC scrambled with the SI-RNTI, the terminal device acquires an SI message such as the SIB 1 from the PDSCH corresponding to the received PDCCH. By acquiring these SI messages, the terminal device is enabled to acquire information related to configurations for the physical channel/physical signal and information related to a cell selection and the like. Further, in a case where the PDCCH involves the CRC scrambled with the P-RNTI, the terminal device can detect the PCH in the PDSCH corresponding to the received PDCCH to acquire the paging information. The terminal device performs an initial access in the random access procedure, in a case of transiting from the idle mode to the connected mode. By performing initial access, the base station device is enabled to acquire information of the terminal device. After completion of the initial access, the terminal device and the base station device can establish the RRC connection. Upon establishing the RRC connection, the terminal device transits to the connected mode. Further, once the terminal device becomes capable of monitoring the PDCCH, the terminal device periodically checks whether the terminal device is in or out of synchronization by using the PDCCH. In a case where out of synchronization is determined, the terminal device notifies the determination to a higher layer. Upon receiving the notification, the higher layer determines the occurrence of Radio Link Failure (RLF) in the cell.

The terminal device and the base station device may employ a technique for aggregating the frequencies (component carriers or frequency bands) of multiple different frequency bands through Carrier Aggregation and treating the aggregated frequencies as a single frequency (frequency band). A component carrier includes an uplink component carrier corresponding to the uplink (uplink cell) and a downlink component carrier corresponding to the downlink (downlink cell). In each embodiment of the present invention, "frequency" and "frequency band" may be used synonymously.

For example, when five component carriers each having a frequency bandwidth of 20 MHz are aggregated through Carrier Aggregation, a terminal device capable of performing Carrier Aggregation performs transmission and reception by assuming that the aggregated carriers have a frequency bandwidth of 100 MHz. Note that component carriers to be aggregated may have contiguous frequencies or partially discontiguous frequencies. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal device, and the frequency bandwidth of component carriers to be aggregated may be different from each other. Each frequency bandwidth may be equal to any of the frequency bandwidth of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal device by the base station device may be the same as or may be fewer than the number of downlink component carriers.

A cell constituted by an uplink component carrier in which an uplink control channel is configured for a radio resource request and a downlink component carrier having a cell-specific connection with the uplink component carrier is referred to as a PCell. A cell constituted by component carriers other than the component carriers of the PCell is referred to as an SCell. The terminal device receives a paging message, detects update of broadcast information, carries out an initial access procedure, configures security information, and the like in a PCell, and may not necessarily perform these operations in the SCell.

The PCell is not a target of activation and deactivation control (in other words, regarded as being always activated), whereas the SCell has activated and deactivated states, the change of which is explicitly specified by the base station device or is made on the basis of a timer configured for the terminal device for each component carrier. A PCell and an SCell are collectively referred to as a serving cell.

Carrier Aggregation achieves communication using multiple component carriers (frequency bands) using multiple cells, and is also referred to as cell aggregation. The terminal device may have a radio connection (RRC connection) with the base station device via a relay station device (or a repeater) for each frequency. In other words, a base station device in the present embodiment may be replaced with a relay station device.

The base station device manages a cell, which corresponds to an area where terminal devices can communicate with the base station device, for each frequency. A single base station device may manage multiple cells. Cells are classified into multiple types of cells depending on the size of the area (cell size) that allows for communication with terminal devices. For example, cells are classified into macro cells and small cells. Moreover, small cells are classified into femto cells, pico cells, and nano cells depending on the size of the area. When a terminal device is capable of communicating with a certain base station device, a cell configured to be used for the communication with the terminal device is referred to as a serving cell, while the other cells that are not used for the communication are referred to as neighboring cells, among the cells of the base station device.

In other words, in Carrier Aggregation, multiple serving cells thus configured include one PCell and one or more SCells.

The PCell is a serving cell, in which an initial connection establishment procedure (RRC connection establishment procedure) has been performed, in which a serving cell in which a connection re-establishment procedure (RRC connection reestablishment procedure) has been started, or in which a cell has been indicated as a PCell in a handover procedure. The PCell operates at a primary frequency. At a time point when a connection is (re)established, or after such a time point, an SCell may be configured. Each SCell operates at a secondary frequency. The connection may be referred to as an RRC connection. For the terminal device supporting CA, a single PCell and one or more SCells may be aggregated.

In a case where the terminal device is configured with more than one serving cell or is configured with a secondary cell group, the terminal device holds, for each serving cell, a received soft channel bit corresponding to at least a predefined range in response to a decoding failure in code blocks of a transport block for at least a predefined number of transport blocks.

The MTC terminal may support only a function corresponding to a single Radio Access Technology (RAT).

Furthermore, the MTC terminal may support only a single operating band. That is, the MTC terminal may not necessarily support a function relating to Carrier Aggregation.

Furthermore, the MTC terminal may support only Time Division Duplex (TDD) and Half Duplex Frequency Division Duplex (HD-FDD). That is, the MTC terminal may not necessarily support Full Duplex FDD (FD-FDD). The MTC terminal may indicate which duplex mode/frame structure type is supported, via higher layer signaling such as capability information.

Moreover, the MTC terminal may serve as an LTE terminal of category 0 or category 1. That is, in the MTC terminal, the maximum bit number of transport blocks transmittable/receivable in a single Transmission Time Interval (TTI) may be limited. For example, the maximum bit number per TTI may be limited to 1000 bits. In the LTE, one TTI corresponds to one subframe.

Note that in each embodiment of the present invention, TTI and subframe are synonymously used.

Furthermore, the MTC terminal may support only a single duplex mode/frame structure type.

A frame structure type 1 is applicable to both FD-FDD and HD-FDD. In the FDD, 10 subframes can be used for each of downlink transmission and uplink transmission at every 10-ms intervals. Moreover, the uplink transmission and the downlink transmission are separated in the frequency domain. In an HD-FDD operation, the terminal device cannot perform transmission and reception at the same time, but in an FD-FDD operation, there is no such a limitation.

Furthermore, in the MTC terminal, only a narrow bandwidth such as 1.4 MHz may be supported in the downlink and uplink. That is, the MTC terminal may not necessarily communicate in a wide bandwidth such as 20 MHz.

The MTC terminal having such a limitation on available bandwidth may be operated in any system bandwidth. For example, scheduling for the MTC terminal supporting only 1.4 MHz bandwidth may also be performed in an operating band of 20 MHz system bandwidth.

Furthermore, the MTC terminal may support only a single RF unit/baseband unit (e.g., 1.4 MHz RF bandwidth) in the downlink and uplink.

The base station device may perform control/scheduling such that a terminal supporting the MTC (MTC terminal) and a terminal not supporting the MTC (non-MTC terminal) can perform FDM. In other words, scheduling for a radio resource allocation to the MTC terminal, for example, is performed by considering the scheduling for a radio resource allocation to the non-MTC terminal, for example.

The higher layer signaling may configure a retuning time (the time necessary for the tuning (the number of subframes or symbols)), when the frequency hopping changes and the used frequency changes.

The transmit power for the MTC terminal may be reduced. The power class and the like may be configured uniquely to the MTC terminal.

For example, in the MTC terminal, the number of downlink transmission modes (PDSCH transmission modes) to be supported may be reduced. That is, when the number of downlink transmission modes or a downlink transmission mode supported by the MTC terminal is indicated as the capability information from the MTC terminal, the base station device configures the downlink transmission mode, based on the capability information. Note that when a parameter for a downlink transmission mode that is not supported by the MTC terminal is configured, the MTC terminal may ignore the configuration. That is, the MTC terminal may not necessarily perform processing for the downlink transmission mode that is not supported. Here, the downlink transmission mode is used to indicate a transmission scheme of the PDSCH corresponding to the PDCCH/EPDCCH, based on a configured downlink transmission mode, the type of RNTI, a DCI format, or a search space. The terminal device learns, for example, whether the PDSCH is transmitted through an antenna port 0, transmitted through the transmit diversity scheme, or transmitted through multiple antenna ports, based on such pieces of information. The terminal device can properly perform a reception process, based on the pieces of information. Even when the DCI related to the PDSCH resource allocation is detected from the same type of DCI format, in a case where the downlink transmission mode or the type of RNTI is different, the PDSCH is not always transmitted through the same transmission scheme.

Moreover, in the MTC terminal, loads of processes in the downlink and uplink may be reduced as compared to the loads of a known LTE terminal.

For example, in the MTC terminal, the maximum transport block size for unicast and broadcast signaling that are supported may be reduced. Furthermore, the number of downlink signals that is simultaneously receivable may be reduced. Furthermore, an Error Vector Magnitude (EVM) request condition for transmission and reception, including a controlled modulation scheme, may be moderated. A physical control channel process may be reduced (e.g., a reduction in the number of blind decodings and the like). A physical data channel process may also be reduced (e.g., moderation of downlink HARQ timeline, a reduction in the number of HARQ process, and the like).

Furthermore, in the MTC terminal, the number of supported CQI/CSI report modes may be reduced. That is, when the MTC terminal indicates, as the capability information, the number of CQI/CSI report modes or a CQI/CSI report mode supported by the MTC terminal, the base station device may configure the CQI/CSI report mode, based on the capability information. Furthermore, when a parameter for the CQI/CSI report mode that is not supported by the MTC terminal is configured, the MTC terminal may ignore such a configuration. That is, the MTC terminal may not necessarily perform processing for the CQI/CSI report mode that is not supported.

To reduce the power consumption, techniques for enhancing (improving) a coverage may be applied to the MTC terminal. These techniques may be applicable to both FDD and TDD.

The coverage enhancement techniques may include a subframe bundling technique along with the HARQ for physical data channels (e.g., PDSCH, PUSCH).

Furthermore, as the coverage enhancement techniques, the use of control channels (e.g., PCFICH, PDCCH) may be controlled.

The coverage enhancement techniques may further include a repetition technique for control channels (e.g., PBCH, PRACH, and PDCCH/EPDCCH). Here, the repetition technique means that data mapped to, for example, a physical channel/physical signal (UL-SCH data, DL-SCH data, user data, control data, and the like) is transmitted without being changed for each transmission (for each transmission subframe or for each TTI). That is, a repetition technique means that a physical channel/physical signal to which the same data is mapped is transmitted a predefined number of times. For the bundling, data to be mapped may be changed at every transmission. Note that in the repetition technique, an addition process of received signals is performed as a reception process to improve the reception accuracy.

Furthermore, the coverage enhancement techniques may include control or the repetition technique for PBCH, PHICH, and PUCCH.

The coverage enhancement techniques may further support a power boost due to supporting of a narrower bandwidth (e.g., 0.5 PRB) than one Physical Resource Block (PRB). That is, an improvement in power density may be supported.

The coverage enhancement techniques may further include a resource allocation using the EPDCCH along with cross carrier scheduling and repetition. Moreover, an operation with no EPDCCH may be considered.

The coverage enhancement techniques may further include a new physical channel format for a System Information Block (SIB)/Random Access Response (RAR)/paging. Information on the RAR or paging (PCH) is transmitted with being mapped to a DL-SCH indicated by a PDCCH (DCI format) along with the CRC scrambled with a certain RNTI, but, a parameter corresponding to a coverage enhancement may be added as a DCI. For example, in accordance with the type of RNTI to be scrambled, a DCI field included in the DCI format may vary. A DCI indicating a repetition duration (the number of repetitions) may be included. A value to be set to the DCI indicating the repetition duration (the number of repetitions) may be determined in accordance with information to be transmitted. That is, the value to be set to the DCI indicating the repetition duration (a repetition number) may be determined in accordance with the type of RNTI to be scrambled, or the DCI indicating the repetition duration (the number of repetitions) may not be included in the DCI format.

Further, the coverage enhancement techniques may include a channel bandwidth (a transmission/reception bandwidth or a measurement bandwidth) and an SIB corresponding to a coverage enhancement.

The coverage enhancement techniques may further support an increase in reference symbol density and a frequency hopping technique.

Furthermore, as the coverage enhancement techniques, the impact on a terminal for the power consumption may be considered to modulate a mistake detection rate for the PRACH, and an initial acquisition duration (initial synchronization duration) between a terminal and a system for a PSS/SSS/PBCH/SIB.

Furthermore, as the coverage enhancement technique, the demanded quantity of the coverage enhancement may be configured for each cell, for each terminal, for each channel, or for each channel group. The measurement and report corresponding to the coverage enhancement may be defined.

Moreover, the coverage enhancement techniques and the functions of coverage enhancement may be applied to each of the MTC terminal and the LTE terminal.

For physical layer control signaling (e.g., EPDCCH) or higher layer control signaling (e.g., SIB, RAR, and a paging message), a solution common to a low-complexity terminal (LC terminal) and a coverage-enhanced terminal (EC terminal) may be applied.

To a UE category/type of both standard coverage and enhanced coverage, a power consumption reduction method for prolonging the battery life may be applied. For example, an actual working time for transmission and reception is reduced. The number of repeated transmission and reception is minimized by minimizing a control message. Moreover, a channel/signal may be changed, improved, re-designed, added, and reduced. Furthermore, a measurement time, a measurement report, feedback signaling, system information acquisition, a synchronization acquisition time, and the like may be optimized for reducing the power consumption.

An MTC technique and the coverage enhancement techniques may be optimized for HD-FDD and TDD.

When the terminal device satisfies a requirement for the MTC and/or coverage enhancement, a process relating to the mobility may be reduced.

The MTC terminal searches for RF channels for a PLMN selection/cell selection for a definite period of time, and unless a suitable cell can be found, the MTC terminal may be powered off.

When the MTC terminal is in the RRC idle state (idle mode), the MTC terminal may continuously receive and compose a PBCH, until an MIB is detected.

In a case where the terminal device supports a function relating to simultaneous transmission of a PUCCH and a PUSCH, and the terminal device supports a function relating to repeated transmission of a PUSCH and/or repeated transmission of a PUCCH, the PUCCH and the PUSCH may be transmitted repeatedly a predefined number of times, at a timing when the PUSCH transmission is performed or at a timing when the PUCCH transmission is performed. That is, the PUCCH and the PUSCH are transmitted at the same time (i.e., in the same subframe).

In such a case, the PUCCH may include a CSI report, an HARQ-ACK, and an SR.

Furthermore, in such a case, since the power density of the PUCCH is greater than the power density of the PUSCH, the terminal device may perform settings in consideration of a predefined power offset, to adjust the transmit power of the PUCCH. In the base station device, when the PUSCH is detected, the PUCCH can also be detected. Therefore, a large quantity of power may not necessarily be allocated to the PUCCH. However, when the PUCCH is repeatedly transmitted alone, the terminal device may not necessarily consider such a predefined power offset. When the PUCCH is repeatedly transmitted solely, the base station device may detect the PUCCH at shorter intervals. In a case of simultaneous transmission of the PUCCH and the PUSCH, the number of repetitions of the PUSCH is applied to the number of repetitions of the PUCCH. In addition, when the PUCCH is transmitted solely, the number of repetitions configured in the PUCCH is applied to the number of repetitions of the PUCCH. Whether to apply a predefined offset may be determined according to whether the simultaneous transmission with the PUSCH is performed. When the number of repetitions is configured for the terminal device, all of the repeated transmission of physical channels is performed according to the number.

The subframe used during the repeated transmission may be determined based on the subframe configuration and the subframe offset. Further, in a case where the DRX is configured, the repeated transmission may be performed in a subframe within a DRX period. Further, in a case where the DTX is configured, the repeated transmission may be performed in a subframe within a DTX period.

In such a case, when the PUCCH transmission overlaps with the PUSCH transmission in the same subframe and the simultaneous transmission of the PUCCH and the PUSCH is supported, the terminal device performs the simultaneous transmission of the PUCCH and the PUSCH in the same subframe the same repetition times or within the same repetition period. At this time, when the transmit power of the PUCCH is configured by the higher layer signaling, the transmit power of PUCCH may be set by using the power offset. Furthermore, when the PUCCH transmission does not overlap the PUSCH transmission, the terminal device sets the transmit power of the PUCCH without using the power offset. In a case where it is indicated that simultaneous transmission of the PUCCH and the PUSCH is supported in a cell allowing for access from the MTC terminal, the base station device assumes that the PUCCH is transmitted at the same timing as the PUSCH, and performs a reception process. For the MTC terminal supporting the simultaneous transmission of the PUCCH and the PUSCH, the base station device may configure the power offset of the PUCCH by using the higher layer signaling.

Furthermore, in such a case, the transmit power of the PUCCH may be set on the basis of a power control adjustment value using a transmit power control command for the PUSCH. That is, a power control adjustment value using a transmit power control command for the PUCCH may not necessarily be considered. However, unless otherwise specified, even when the PUSCH and the PUCCH are transmitted repeatedly in the same subframe the same number of times, a power control adjustment value used for setting each transmit power may be configured individually. That is, when the base station device indicates, by using the higher layer signaling, to use the same power control adjustment value, the transmit power of the PUSCH and the PUCCH is set by using the same power control adjustment value. When individually performing the repeated transmissions of the PUSCH and the PUCCH, the transmit power is set by using each of the power control adjustment values. Furthermore, when an SRS is transmitted repeatedly in the same subframe, the transmit power may be set by using the same power control adjustment value.

An MIB in which a parameter (information) for an MTC terminal is configured in spare bits and an MIB in which a parameter (information) for an MTC terminal is not configured in spare bits may not necessarily be treated as the same MIB. For example, it is assumed that an MIB Type A is regarded as an MIB in which a parameter (information) for an MTC terminal is not configured in spare bits, and an MIB Type B is regarded as an MIB in which a parameter (information) for an MTC terminal is configured in spare bits, the MIB Type A is transmitted at 40-ms intervals, while the MIB Type B may be transmitted at 20-ms intervals. A PBCH subframe and a PBCH radio subframe, in which the MIB Type A and the MIB Type B are arranged, may be different subframes and different radio frames. An LTE terminal receives only the MIB Type A, while an MTC terminal may receive the MIB Type A and the MIB Type B.

An MIB in which a parameter (information) for an MTC terminal is configured in the spare bits may be transmitted in another cycle, in addition to the above-described PBCH cycle. That is, an MIB in which the parameter (information) for the MTC terminal is configured in the spare bits may be transmitted in two subframe sets. In other words, an LTE terminal can receive an MIB of a first subframe set. An MTC terminal can receive MIBs of the first subframe set and a second subframe set.

An SIB (an SIB 1, an SI message, or a new SIB), in which a parameter (information) for an MTC terminal is configured, may be transmitted in another cycle, in addition to the above-described cycle. That is, such an SIB, in which a parameter (information) for an MTC terminal is configured, may be transmitted in two subframe sets. In other words, an LTE terminal can receive an SIB of a first subframe set. An MTC terminal can receive SIBs of the first subframe set and a second subframe set. In such a situation, the configuration of a PDCCH and/or an EPDCCH for this SIB corresponds to the MTC terminal. That is, the MTC terminal does not expect that such an SIB (DL-SCH corresponding to the SIB) is transmitted on the PDCCH/EPDCCH of the downlink bandwidth that is not supported by the MTC terminal.

A PCH including a modification notification of the SIB (the SIB 1, the SI message, the new SIB), in which a parameter (information) for an MTC terminal is configured, may be transmitted in another cycle, in addition to the above-described cycle. That is, such an PCH including a modification notification of the SIB, in which a parameter (information) for the MTC terminal is configured, may be transmitted in two subframe sets. In other words, an LTE terminal can receive a PCH of a first subframe set. An MTC terminal can receive PCHs of the first subframe set and a second subframe set. In such a situation, the configuration of a PDCCH and/or an EPDCCH for this PCH corresponds to the MTC terminal. That is, the MTC terminal does not expect that such a PCH is transmitted on the PDCCH/EPDCCH of the downlink bandwidth that is not supported by the MTC terminal.

When a transmission bandwidth supported by the MTC terminal is narrow (e.g., 5 MHz or less), only the local arrangement may be supported in the EPDCCH transmission type. That is, when the transmission bandwidth supported by the MTC terminal is narrow (e.g., 5 MHz or less), the EPDCCH transmission type may not necessarily perform a distribution arrangement.

When a terminal device supporting MTC functions (an MTC terminal) is allowed to access a cell, such a terminal device supporting MTC functions may monitor a PBCH and a PDCCH from the cell. In such a case, when information on the configuration of a PDCCH for the MTC terminal is set to an MIB (or the spare bits of the MIB) and/or a System Information (SI) message, the PDCCH is monitored according to a resource allocation and a subframe number, as well as an OFDM symbol (start symbol) and the like included in the configuration of the PDCCH of the MIB and/or SI message. In such a situation, when a predefined number of times or a predefined period is configured for the PDCCH, the MTC terminal may repeatedly receive the PDCCH and improve the reception accuracy. By receiving the PDCCH along with a CRC scrambled with the P-RNTI is received, the MTC terminal acquires paging information from a PCH indicated by a DCI included in the PDCCH. Note that this P-RNTI is configured by using system information or higher layer signaling.

Moreover, in such a case, when the information on the configuration of the PDCCH for the MTC terminal is not set in the MIB (or the spare bits of the MIB) and/or in the SI message, and when a P-RNTI value is set to information on the configuration of the EPDCCH, by receiving the EPDCCH along with the CRC scrambled with the P-RNTI, the MTC terminal acquires the paging information from a PCH indicated by the DCI included in the PDCCH. Note that the information on such a configuration of the EPDCCH is configured by using higher layer signaling.

Moreover, in such a case, when the information on the configuration of the PDCCH for the MTC terminal is not set in the MIB (or the spare bits of the MIB) and/or in the SI message, and when a P-RNTI value is not set to information on the configuration of the EPDCCH, and when the MTC terminal supports the downlink transmission bandwidth that is configured in the MIB and/or the SI message, by receiving a PDCCH along with a CRC scrambled with the P-RNTI from a PDCCH domain allocated to the downlink transmission bandwidth, the MTC terminal acquires the paging information from a PCH indicated by DCI included in the PDCCH. Note that this P-RNTI is a default value or a predefined value. That is, this P-RNTI value may not be configured by using higher layer signaling.

Moreover, in such a case, when the information on the configuration of the PDCCH for the MTC terminal is not set in the MIB (or the spare bits of the MIB) and/or in the SI message, and when a P-RNTI value is not set to information on the configuration of the EPDCCH, and when the MTC terminal does not support the downlink transmission bandwidth that is configured in the MIB and/or in the SI message, the MTC terminal does not monitor the PDCCH from the PDCCH domain allocated to the downlink transmission bandwidth. The MTC terminal cannot monitor the PDCCH along with the CRC scrambled with the P-RNTI in a bandwidth that is not supported. Therefore, the MTC terminal cannot detect a PCH.

Moreover, in such a case, the base station device may not necessarily make a change, with respect to the paging information, of the system information on the MTC terminal.

All signals are transmittable and receivable in a PCell, but some signals are not transmittable or receivable in an SCell. For example, a PUCCH is transmitted only in a PCell. Additionally, unless multiple Timing Advance Groups (TAGs) are configured for the cells, a PRACH is transmitted only in a PCell. Additionally, a PBCH is transmitted only in a PCell. Additionally, a Master Information Block (MIB) is transmitted only in a PCell. However, in a case where a terminal device supports a function of transmitting a PUCCH and an MIB in an SCell, a base station device may instruct the terminal device to transmit a PUCCH and an MIB in such an SCell. That is, in the case where the terminal device supports the function, the base station device may configure, for the terminal device, a parameter for transmitting a PUCCH and an MIB in the SCell.

In a PCell, a Radio Link Failure (RLF) is detected. In an SCell, even with conditions for detection of an RLF are met, the detection of the RLF is not recognized. In a lower layer of the PCell, when conditions for an RLF are satisfied, the lower layer of the PCell notifies a higher layer of the PCell of the fact that the conditions for an RLF are satisfied.

Semi-Persistent Scheduling (SPS) or Discontinuous Transmission (DRX) may be performed in a PCell. In an SCell, the same DRX as the DRX in a PCell may be performed. In an SCell, MAC configuration information/parameters are basically shared with the PCell of the same call group. Some of the parameters (e.g., sTAG-Id) may be configured for each SCell. Some of timers or counters may be applied to the PCell only. A timer or a counter applied to the SCell only may be configured.

Figure 3:
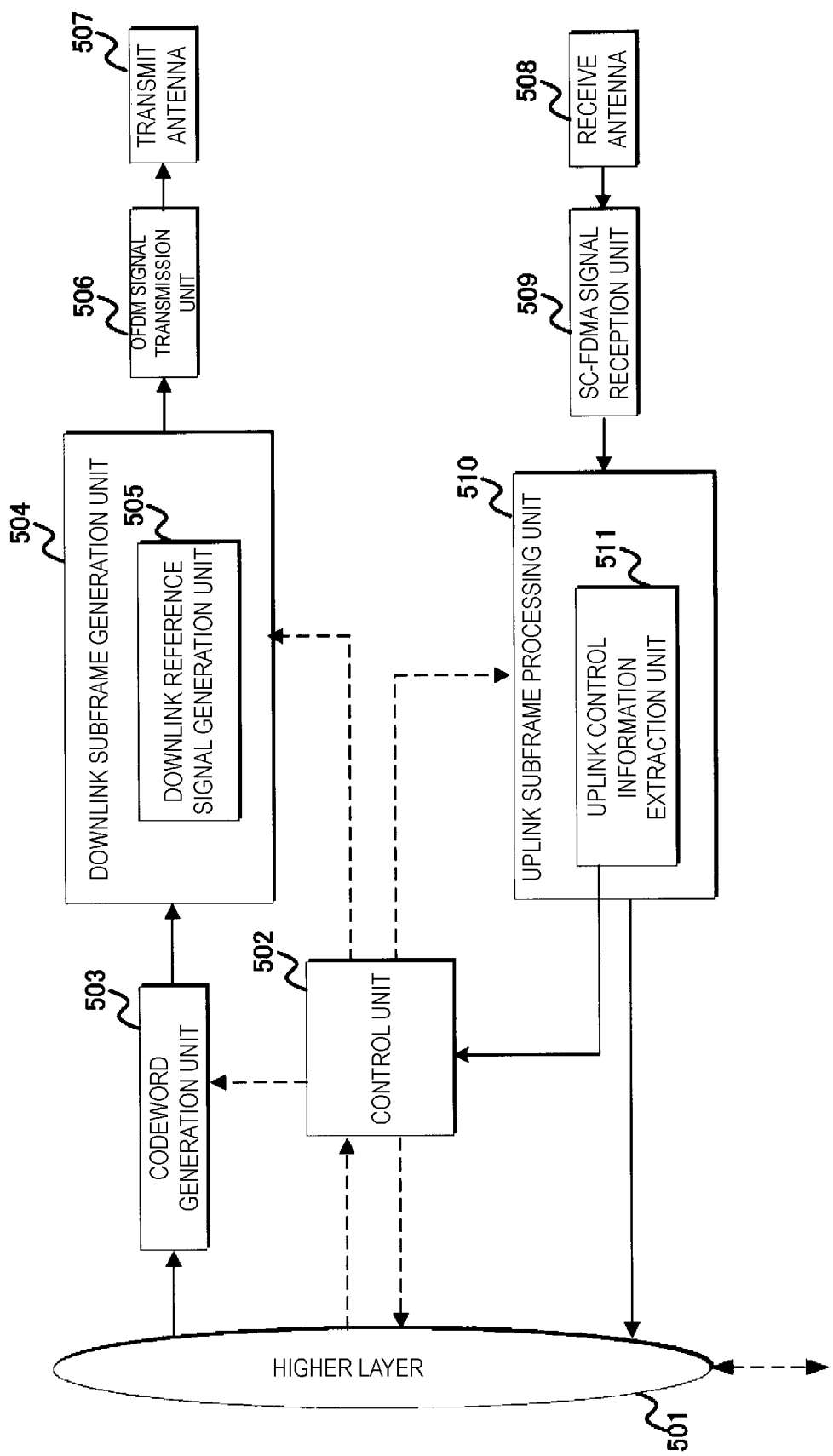
FIG. 3 is a diagram illustrating an example of a block configuration of a base station device according to the first embodiment.

FIG. 3 is a schematic diagram illustrating an example of a block configuration of a base station device 2 according to the present embodiment. The base station device 2 includes a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit/HARQ-ACK acquisition unit/SR acquisition unit) 511.

Figure 4:
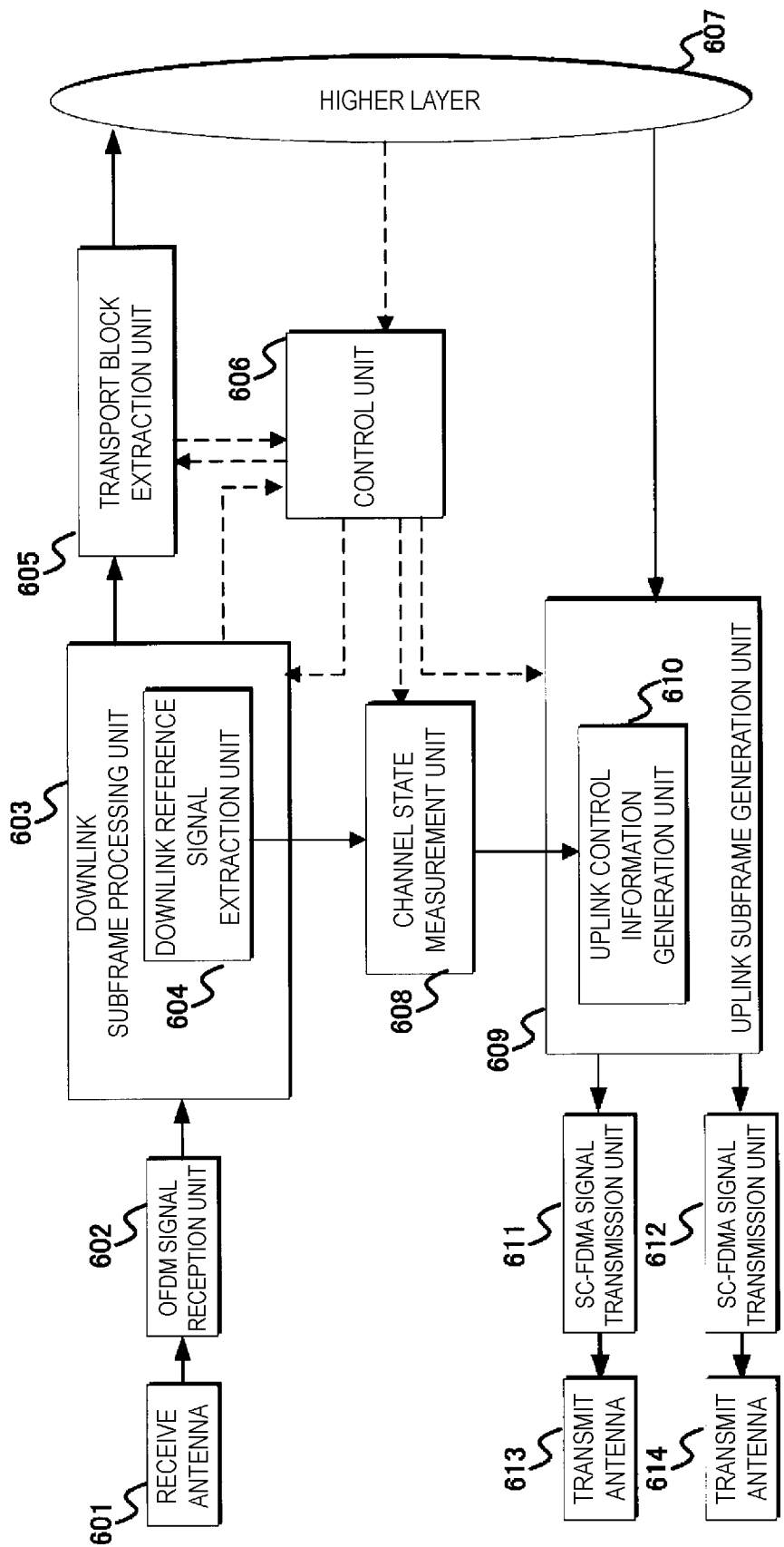
FIG. 4 is a diagram illustrating an example of a block configuration of a terminal device according to the first embodiment.

FIG. 4 is a schematic diagram illustrating an example of a block configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610.

In each of FIG. 3 and FIG. 4, higher layers may include a Medium Access Control (MAC) layer, a Radio Link Control (RLC) layer, a Packet Data Convergence Protocol (PDCP) layer, and a Radio Resource Control (RRC) layer.

The RLC layer transmits to the higher layers: Transparent Mode (TM) data, Unacknowledged Mode (UM) data, and Acknowledged Mode (AM) data including an indication indicates that Packet Data Unit (PDU) transmission by the higher layer has succeeded. Further, the RLC layer transmits data, and notifies a transmission opportunity with a whole size of the RLC PDU transmitted in a transmission opportunity to the lower layers.

The RLC layer supports: a function associated with transmission of the higher layer PDU, a function associated with an error correction with the Automatic Repeat reQuest (ARQ) (only for the AM data transmission), a function associated with combination/division/reconstruction of a RLC Service Data Unit (SDU) (only for the UM and AM data transmission), a function associated with redivision of the RLC data PDU (for the AM data transmission), a function associated with sorting of the RLC data PDU (only for the AM data transmission), a function associated with overlap detection (only for the UM and AM data transmission), a function associated with abandonment of the RLC SDU (only for the UM and AM data transmission), a function associated with RLC re-establishment, and a function associated with protocol error detection (only for the AM data transmission).

First, a flow of downlink data transmission and reception will be described with reference to FIG. 3 and FIG. 4. In the base station device 2, the control unit 502 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 503 and the downlink subframe generation unit 504, based on these elements. Downlink data (also referred to as a downlink transport block, DL-SCH data, or DL-SCH transport block) transmitted from the higher layer 501 is processed through error correction coding, rate matching, and the like in the codeword generation unit 503, under the control of the control unit 502, and a codeword is then generated. Two codewords at maximum are transmitted at the same time in a single subframe of a single cell. The control unit 502 instructs the downlink subframe generation unit 504 to generate a downlink subframe. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information on the higher layer (e.g., dedicated (individual) Radio Resource Control (RRC) signaling). Moreover, the downlink reference signal generation unit 505 generates a downlink reference signal. The downlink subframe generation unit 504 maps the downlink reference signal to the REs in the downlink subframes in accordance with an instruction from the control unit 502. The OFDM signal transmission unit 506 modulates the downlink subframe generated by the downlink subframe generation unit 504 to an OFDM signal, and then transmits the OFDM signal through the transmit antenna 507. Although a configuration of including one OFDM signal transmission unit 506 and one transmit antenna 507 is illustrated as an example here, a configuration of including multiple OFDM signal transmission units 506 and multiple transmit antennas 507 may be employed for transmitting downlink subframes through multiple antenna ports. Moreover, the downlink subframe generation unit 504 may also have a capability of generating physical-layer downlink control channels, such as a PDCCH and an EPDCCH to map the channels to REs in downlink subframes. Multiple base station devices each transmit separate downlink subframes.

In the terminal device 1, an OFDM signal is received by the OFDM signal reception unit 602 through the receive antenna 601, and an OFDM demodulation process is performed on the signal.

The downlink subframe processing unit 603 first detects physical-layer downlink control channels, such as a PDCCH and an EPDCCH. More specifically, the downlink subframe processing unit 603 decodes signals by assuming that a PDCCH and an EPDCCH have been transmitted in the regions to which the PDCCH and the EPDCCH can be allocated, and checks Cyclic Redundancy Check (CRC) bits added beforehand (blind decoding). In other words, the downlink subframe processing unit 603 monitors a PDCCH and an EPDCCH. When the CRC bits match an ID (a single terminal-specific identifier assigned to a single terminal, such as a Cell-Radio Network Temporary Identifier (C-RNTI) or a Semi-Persistent Scheduling-C-RNTI (SPS-C-RNTI), or a Temporary C-RNTI) assigned by the base station device beforehand, the downlink subframe processing unit 603 recognizes that a PDCCH or an EPDCCH has been detected and extracts a PDSCH by using control information included in the detected PDCCH or EPDCCH.

The control unit 606 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 603, the transport block extraction unit 605, and the like, in accordance with these elements. More specifically, the control unit 606 controls the downlink subframe generation unit 504 to carry out an RE demapping process, a demodulation process, and the like, corresponding to an RE mapping process and a modulation process. The PDSCH extracted from the received downlink subframe is transmitted to the transport block extraction unit 605. Furthermore, the downlink reference signal extraction unit 604 in the downlink subframe processing unit 603 extracts the downlink reference signal from the downlink subframe.

The transport block extraction unit 605 extracts a transport block that has been subjected to a rate matching process, a rate matching process corresponding to error correction coding, error correction decoding, and the like in the codeword generation unit 503, and transmits the extracted transport block to the higher layer 607. The transport block includes higher-layer control information, and the higher layer 607 notifies the control unit 606 of a necessary physical-layer parameter, based on the higher-layer control information. The multiple base station devices 2 each transmit separate downlink subframes, and the terminal device 1 receives the downlink subframes. Hence, the above-described processes may be carried out for the downlink subframe of each of the multiple base station devices 2. In this situation, the terminal device 1 may recognize or may not necessarily recognize that multiple downlink subframes have been transmitted from the multiple base station devices 2. In a case where the terminal device 1 does not recognize the subframes, the terminal device 1 may simply recognize that multiple downlinks subframes have been transmitted in multiple cells. Moreover, the transport block extraction unit 605 determines whether or not the transport block has been detected correctly, and transmits a determination result to the control unit 606.

Here, the transport block extraction unit 605 may include a buffer portion (soft buffer portion). In the buffer portion, information on the extracted transport block can be stored temporarily. For example, when the same transport block (retransmitted transport block) is received, and decoding of data for this transport block is not successful, the transport block extraction unit 605 combines (composes) newly received data with the data for this transport block temporarily stored in the buffer portion, and attempts to decode the combined data. When the temporarily-stored data becomes unnecessary or when a predefined condition is satisfied, the buffer portion flushes the data. A condition for data to be flushed differs depending on the type of transport block corresponding to the data. The buffer portion may be prepared for each data type. For example, as the buffer portion, a message-3 buffer or an HARQ buffer may be prepared, or a buffer portion may be prepared for each layer, L1/L2/L3. Note that flushing information/data includes flushing a buffer in which information and data are stored.

In a case where the information on the configuration of the PDCCH for the MTC terminal is included in an MIB, the buffer portion of the MTC terminal temporarily buffers the information. The reception of an SIB (the SIB 1 and other SI messages) in addition to an MIB in the same TTI or a different TTI may cause an overflow in the buffer portion. When such an overflow occurs in the buffer portion and the information on the configuration of a PDCCH for the MTC terminal is not included in the SIB, the buffer portion holds the system information of the MIB and flushes the system information of the SIB. However, in a case where the information on the configuration of the PDCCH for the MTC terminal is included in the SIB and an overflow occurs due to the reception of the MIB and the SIB, the buffer portion holds the system information of the SIB and flushes the system information of the MIB. When a PCH can be detected according to the information on the configuration of the PDCCH for the MTC terminal of the MIB or the SIB, and the information on the configuration of PDCCH is not included in paging information in the PCH, in this situation, even if an overflow occurs due to the reception of the MIB or SIB and paging information, the buffer portion gives priority to hold the information on the configuration of the PDCCH for the MTC terminal included in the MIB or the SIB, and flushes the paging information that has been overflowed. However, in a case where a notification about a modification of the SIB including the information on the configuration of the PDCCH for the MTC terminal is included in the received paging information and an overflow occurs due to the reception of the MIB and the paging information, the buffer portion holds the paging information and flushes the MIB. For example, the buffer portion of the MTC terminal determines priority for holding a buffer based on the information on the configuration of the PDCCH for the MTC terminal. Moreover, when an overflow occurs, the buffer portion of the MTC terminal may also determine information to be flushed, based on whether a parameter relating to the configuration of the MTC terminal is included.

When an overflow occurs, the buffer portion of the MTC terminal in the idle mode may give priority to holding the information on the configuration of the MTC terminal and may flush any other information. For example, when the information on the configuration of the MTC terminal is set only to the MIB, the buffer portion may hold the MIB and may flush other information that has been overflowed. When the information on the configuration of the MTC terminal is set only to the SIB, the buffer portion may hold the SIB and may flush other information that has been overflowed.

When an overflow occurs and the information on the configuration of the MTC terminal is set to each of the MIB, the SIB, and the RRC message, the buffer portion of the MTC terminal in the connected mode may hold information on the configuration of the MTC terminal that is set to the RRC message, and may flush any other information that has been overflowed. In a case where the information on the configuration of the MTC terminal is set only to a specific message, the buffer portion may give priority to holding the specific message, and flush any other information that has been overflowed.

Regardless of the idle mode and the connected mode, the MTC terminal gives priority to holding the information on the configuration of the PDCCH, in particular.

Next, a flow of uplink signal transmission and reception will be described. In the terminal device 1, the control unit 606 instructs a downlink reference signal extracted by the downlink reference signal extraction unit 604 to be transmitted to the channel state measurement unit 608, and then instructs the channel state measurement unit 608 to measure the channel state and/or interference, and further to calculate CSI based on the measured channel state and/or interference. The control unit 606 instructs the uplink control information generation unit 610 to generate an HARQ-ACK (DTX (not transmitted yet), ACK (detection success), or NACK (detection failure)) and to map the HARQ-ACK to a downlink subframe, based on a determination result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe, and an uplink subframe is generated.

The SC-FDMA signal reception unit 509 receives an SC-FDMA signal through the receive antenna 508, and performs an SC-FDMA demodulation process on the signal. In the uplink subframe processing unit 510, the control unit 502 instructs extraction of RBs, to which the PUCCH is mapped, and instructs the uplink control information extraction unit 511 to extract the CSI included in the PUCCH. The extracted CSI is transmitted to the control unit 502. The CSI is used for controlling downlink transmission parameters (MCS, downlink resource allocation, HARQ, and the like) by the control unit 502.

The base station device assumes a maximum output power $P_{CMAX}$ configured by the terminal device from a power headroom report, and assumes an upper limit value of the power for each physical uplink channel, based on the physical uplink channel received from the terminal device. The base station device determines a transmit power control command value for a physical uplink channel, based on the above assumptions, and transmits the value to the terminal device on a PDCCH along with a downlink control information format. The above operations achieve a power adjustment for the transmit power of the physical uplink channel transmitted from the terminal device.

The base station device allocates resources to the PDCCH/PDSCH to prevent an allocation to the PBCH resource, in a case of transmitting the PDCCH (EPDCCH)/PDSCH to the MTC terminal. For example, the base station device allocates the PDSCH resource while preventing overlapping the PBCH resource, in a case of transmitting the PDSCH for transmitting the SIB (MTC SIB) for the MTC terminal. The base station device may not transmit the PDSCH for transmitting the MTC SIB in a subframe, in which the PBCH is transmitted. That is, the terminal device does not expect MTC SIB detection in the same subframe, in which the PBCH is transmitted.

The PDSCH may be used for transmitting the respective messages/information related to SIB/RAR/paging/unicast for the MTC terminal. In a case that repeated transmission is applied to the PDSCH and the frequency hopping is applied during the repeated transmission, the frequency hopping patterns in the PDSCH may be configured per transmitted information. That is, the frequency hopping patterns for the PDSCH, which is used for transmitting the respective messages/information related to SIB/RAR/paging unicast may differ.

The frequency hopping for the PUSCH may be separately configured according to a grant type. For example, parameter values used for the frequency hopping in the PUSCH corresponding to each of a dynamic schedule grant, a semi-persistent grant, and an RAR grant may be separately configured. These parameters may not be indicated in the uplink grant. Further, these parameters may be configured through the higher layer signaling including the system information.

In addition to the parameter associated with the resource allocation, a parameter associated with the frequency hopping may be configured to each physical channel (e.g., PDSCH, PDCCH (EPDCCH), PUSCH, PUCCH, PRACH) for the MTC terminal. The parameter associated with the frequency hopping may be configured by using the higher layer signaling and the system information.

The base station device configures various parameters not to transmit a resource allocation for each downlink physical channel (e.g., the PDSCH or the PDCCH) for the MTC terminal in the same resource for the PBCH for the PBCH and/or the MTC terminal, regardless or absence of the frequency hopping.

The base station device configures various parameters not to allocate a resource of each uplink physical channel (e.g., the PUSCH, the PUCCH, or the PRACH) for the MTC terminal to an existing PUCCH domain for the LTE terminal, regardless of the presence or absence of the frequency hopping.

Figure 5:
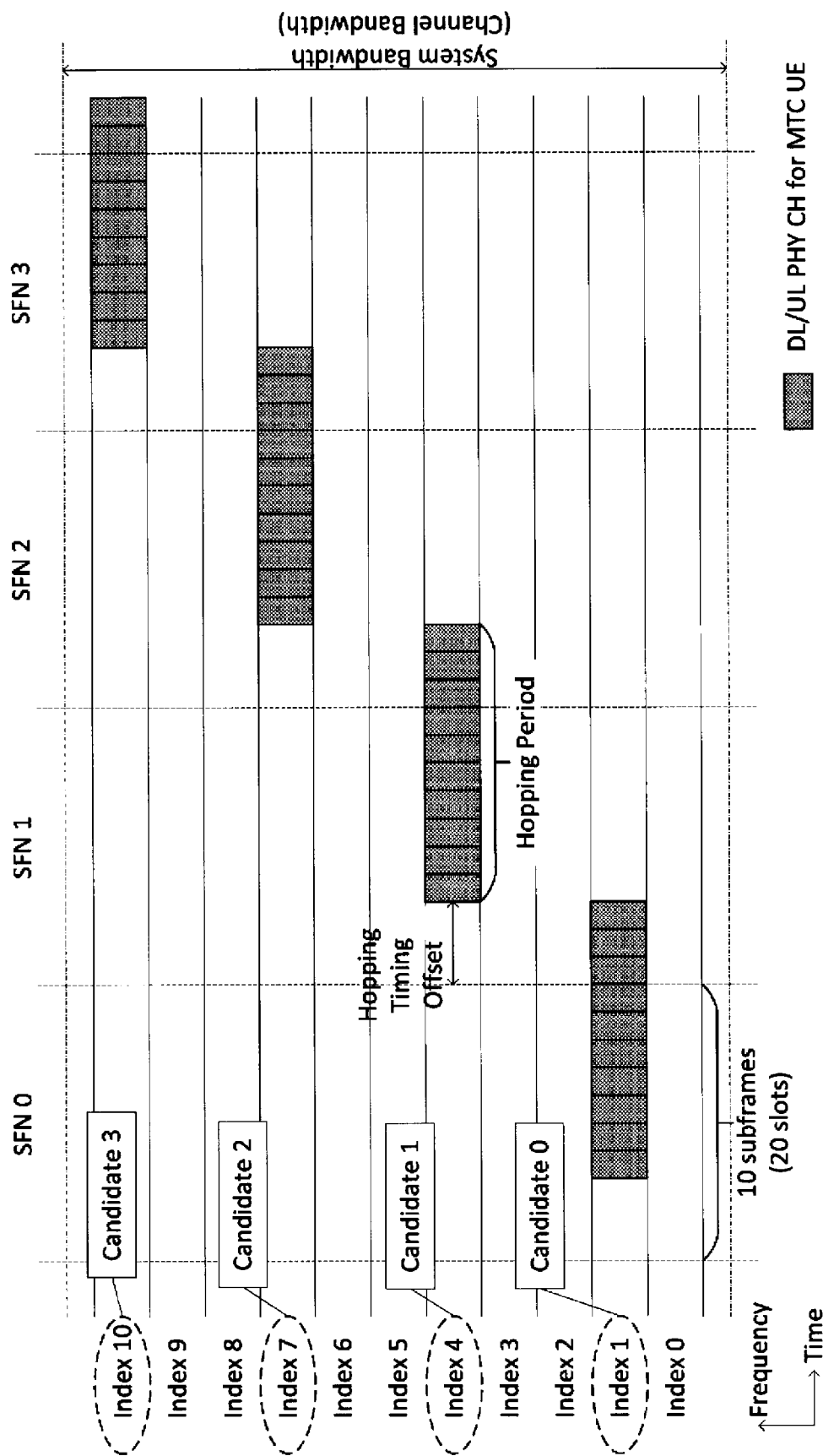
FIG. 5 is a diagram illustrating an example of a resource allocation and frequency hopping of the Downlink/Uplink Physical CHannel (DL/UL PHY CH) according to the first embodiment.

FIG. 5 is a diagram illustrating an example of a resource allocation for a downlink/uplink physical channel and frequency hopping according to the first embodiment. Indexes (indexes associated with a resource block group (narrow bandwidth)) may be assigned in accordance with the narrow bandwidth and the system bandwidth (channel bandwidth, transmission bandwidth) allocated for the MTC. For example, in a case that the narrow bandwidth for the MTC is 6 RBs and the system bandwidth (channel bandwidth, transmission bandwidth) is 100 RBs, up to 16 indexes (Index 0 to Index 15) may be assigned in a frequency direction (a resource block direction). The number of indexes may be uniquely configured based on the system bandwidth (channel bandwidth, transmission bandwidth) and the narrow bandwidth, or the base station device may select one of some patterns and may configure such a selected pattern to the terminal device using the higher layer signaling or the PDCCH. The base station device may select/configure indexes for the resource allocation and/or the frequency hopping from these indexes, and may configure the indexes to the terminal device by using the higher layer signaling or the PDCCH. The index (physical resource) to which such physical channels are possibly allocated may be referred to as a candidate. FIG. 5 illustrates a diagram illustrating a case of 11 indexes and 4 candidates (Index 0 to Index 10, Candidate 0 to Candidate 3). The indexes may be appropriately assigned in consideration of a carrier frequency (center frequency). In FIG. 5, indexes are assigned in consideration of the carrier frequency, without consideration of from the bottom or the top of the system bandwidth (channel bandwidth, transmission bandwidth). The Candidate 0 to Candidate 3 are respectively configured to correspond to Indexes 1, 4, 7, and 10. In one embodiment of the present invention, the above correspondence is illustrated, but may not necessarily have the above correspondence. For example, the Candidate 0 to Candidate 3 may respectively correspond to Indexes 0, 10, 3, and 7, and other examples are applicable. In FIG. 5, a period for hopping (hopping period) is configured in a case where the frequency hopping is applied. The hopping period serves as a parameter indicating a transmitting period for transmitting the physical channel/the physical signal in an identical index (a physical resource), or indicating a switching cycle of the frequency hopping. In FIG. 5, the hopping period is set to 10 ms (10 subframes). The frequency hopping timing, in other words, the candidate switching timing may be determined based on a SFN (System Frame Number, radio frame number), a subframe number (slot number), a hopping offset, the total number of candidates, and the like. Here, the hopping timing offset serves as a parameter indicating a slot offset or a subframe offset with respect to the subframe 0 in a SFN 0. By configuring the hopping timing offset, the position of the hopping subframe or the hopping slot can be shifted. Specifically, the hopping timing offset enables shifting of the reference of the frequency hopping timing from the subframe 0 in the SFN 0. The candidate switching timing corresponding to the candidate index is represented by Expression 1. The above frequency hopping may be applied during the repeated transmission.

$$\text{Candidate\_index}(n_s) = \lfloor (n_f \times 10 + \lfloor n_s/2 \rfloor - \text{HTO})/T \rfloor \bmod N \quad \text{[Expression 1]}$$

Here $n_f$ is a SFN. $n_s$ is a slot number. HTO is a value of the hopping timing offset (the number of subframes). N is the total number of candidates. T is a hopping period. This expression considers the frequency hopping in the unit of subframe. Expression 1 is an expression for calculating the candidate index for a given slot and a given subframe. Further, a floor function for calculating the largest integer, which is less than or equal to a real number X, is used in Expression 1. Further, a MOD function for calculating a remainder of a division is used in Expression 1. In a case that the slot number need not be considered, Expression 2 may be applicable.

$$\text{Candidate\_index}(SF) = \lfloor (n_f \times 10 + SF - \text{HTO})/T \rfloor \bmod N \quad \text{[Expression 2]}$$

Here, SF is a subframe number. Expression 2 is an expression for calculating a candidate index for a given subframe. In a case that the frequency hopping for each slot is allowed, Expression 3 may be indicated.

$$\text{Candidate\_index}(n_s) = \lfloor (n_f \times 10 + n_s - \text{HTO})/T \rfloor \bmod N \quad \text{[Expression 3]}$$

Here, the number of slots may be configured to the HTO.

By limiting the number of candidates, the load associated with frequency tuning can be reduced. However, in a case of no load associated with tuning, the number of candidates may be identical to the number of indexes, or no candidate may be configured. In this case, the candidate index in the above described expressions may be replaced with an index associated with a resource block group (narrow bandwidth), and N may be replaced with the total number of indexes associated with the physical resource block. In this case, a parameter (Start index) for shifting the index from Index 0 may be configured for applying Frequency Division Multiplexing (FDM) at the subframe 0 in the SFN 0 or a reference subframe. For example, Expression 1 may be indicated as Expression 4.

$$\text{Index}(n_s) = \{\lfloor (n_f \times 10 + \lfloor n_s/2 \rfloor - \text{HTO})/T \rfloor + \text{Start\_index}\} \bmod N \quad \text{[Expression 4]}$$

In this case, Expression 2 and Expression 3 may be changed in a similar manner. Further, in this case, a parameter (Delta index) for larger frequency hopping may be configured, instead of the frequency hopping to an adjacent index. For example, Expression 4 may be changed to Expression 5.

$$\text{Index}(n_s) = \{\lfloor (n_f \times 10 + \lfloor n_s/2 \rfloor - \text{HTO})/T \rfloor \times \text{Delta\_index} + \text{Start\_index}\} \bmod N \quad \text{[Expression 5]}$$

Note that Expression 2 and Expression 3 may be changed in a similar manner. In Expression 1 to Expression 5, in a subframe and/or a slot in which the PSS/SSS/PBCH/MTC SIB/MTC paging are transmitted, in a case that an index overlapping the resources for the PSS/SSS/PBCH/MTC SIB/MTC paging is indicated (such a resource is transmitted on Index 5 in FIG. 5), the base station device may not necessarily transmit the downlink physical channel in such an index. Further, the terminal device may not expect that the downlink physical channel other than the PSS/SSS/PBCH/MTC SIB/MTC paging is transmitted in the index of the subframe and/or the slot.

Figure 6:
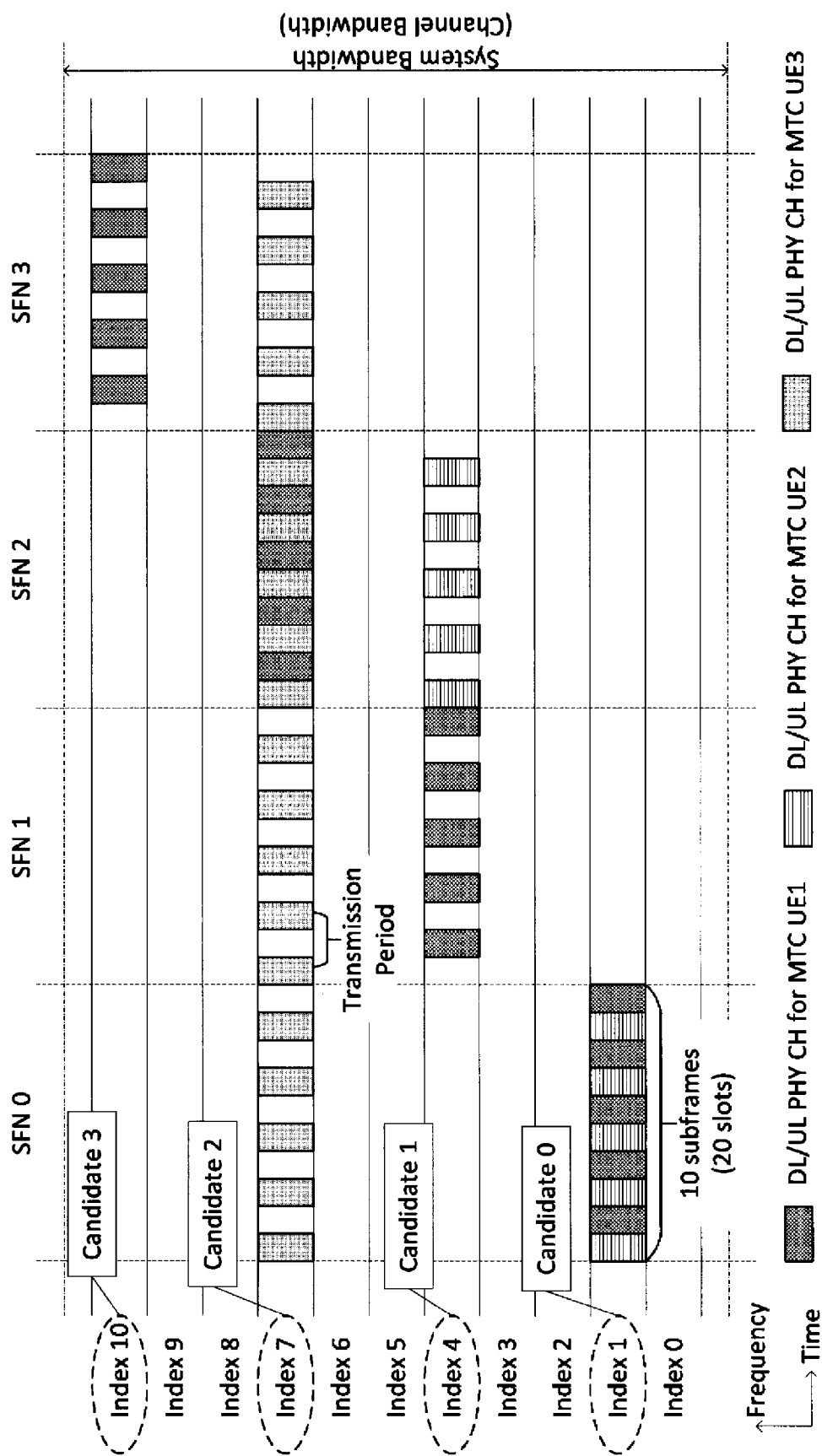
FIG. 6 is a diagram illustrating another example of the resource allocation and the frequency hopping of the downlink/uplink physical channel according to the first embodiment.

FIG. 6 is a diagram illustrating another example of a resource allocation for the downlink/uplink physical channel and the frequency hopping according to the first embodiment. In FIG. 6, the resource allocation is performed in consideration of a Time Division Multiplexing (TDM). For performing the TDM, a transmission period is configured to the terminal device. The transmission period is used for configuring a transmission interval for a transmission signal in a hopping period. Four candidates are configured for an MTC terminal 1 (MTC UE1). Four candidates, not illustrated, are configured for an MTC terminal 2 (MTC UE2). Further, one candidate is configured for an MTC terminal 3 (MTC UE3). The hopping period is configured for each terminal device. Moreover, in a case where the transmission period is configured, a transmission offset in the hopping period may further be configured. Note that the transmission period configured for each MTC terminal is 2 ms (2-subframe period), in FIG. 6. The base station device may configure various parameters to prevent a resource collision between the MTC terminals and/or the LTE terminals.

Figure 7:
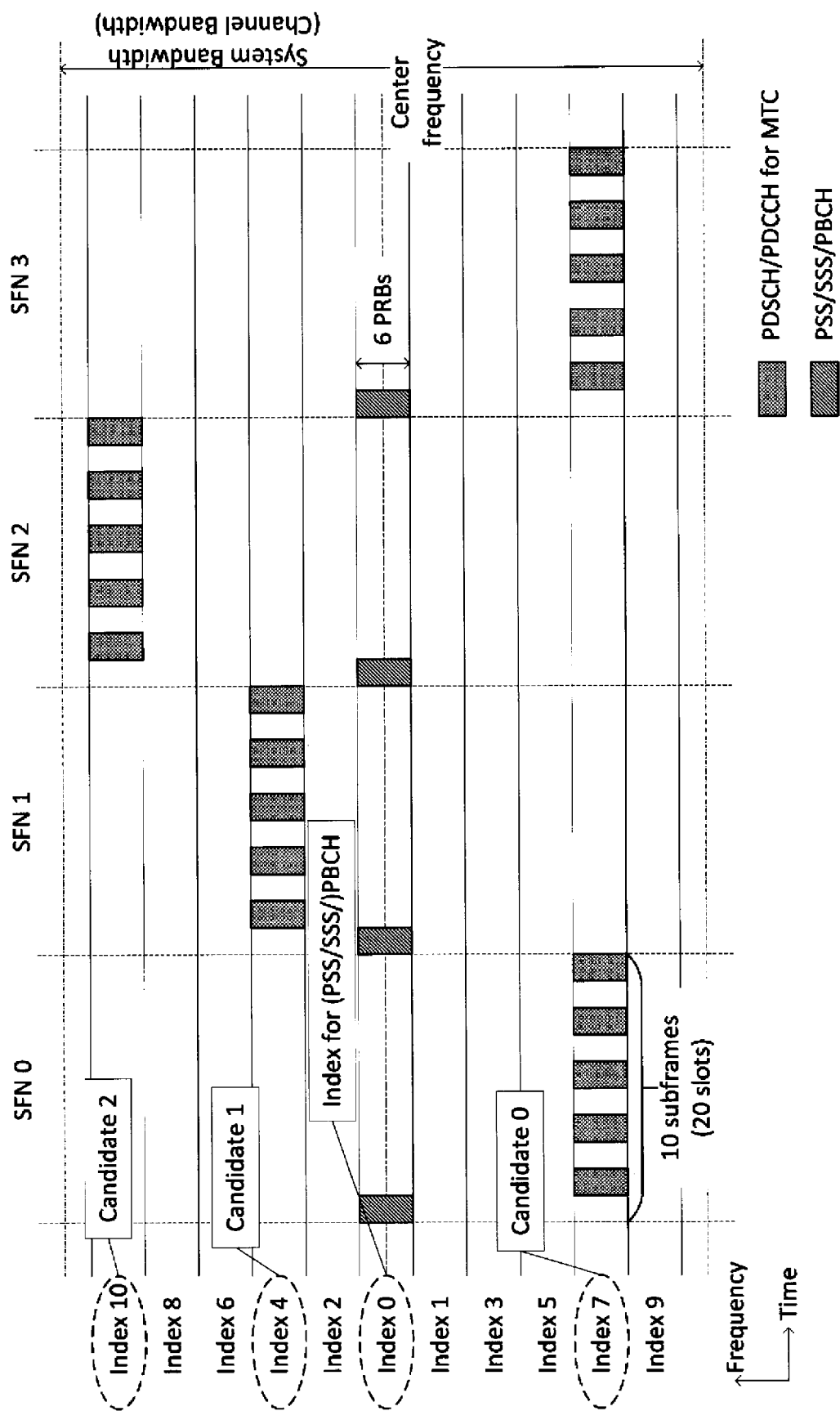
FIG. 7 is a diagram illustrating an example of an index configuration associated with narrow bandwidth according to the first embodiment.

FIG. 7 is a diagram illustrating an example of indexes with indicators (an index configuration) associated with the narrow bandwidth. For example, in the downlink, the PSS/SSS/PBCH are transmitted on 6 PRBs (6 RBs), the center of the system bandwidth. In FIG. 7 the index 0 corresponds to that resource to prevent overlapping with the resource of the PSS/SSS/PBCH. Other indexes, for example, may be indicated as Expression 6.

[Expression 6]

$$\text{Index } k = \begin{cases} N_{RB}^{DL} \cdot N_{SC}^{RB}/2 - 36 + 72 \cdot \lceil k/2 \rceil + n & \text{if } k \text{ is even number} \\ NH_{RB}^{DL} \cdot N_{SC}^{RB}/2 + 36 + 72 \cdot \lceil k/2 \rceil + n & \text{if } k \text{ is odd number} \end{cases}$$

$$n = 0, \ldots, 71$$

Note that a ceiling function for calculating the smallest integer, which is larger than or equal to the real number X, is used Expression 6. $N^{DL}_{RB}$ is the downlink system bandwidth (or the channel bandwidth, or the transmission bandwidth) and is represented as the number of resource blocks (the number of multiplexed subcarriers). $N^{RB}_{SC}$ is the number of subcarriers per 1 PRB (RB). k is an index value illustrated in FIG. 7. n denotes a subcarrier number in the narrow bandwidth (6 PRBs). In two expressions in Expression 6, the value of k, which is an odd number or an even number, may be reversed. Note that the total amount of n (or the largest value) may be determined based on the narrow bandwidth and the number of subcarriers per 1 PRB, based on the PBCH bandwidth and the number of subcarriers per 1 PRB, or based on the MTC SIB bandwidth and the number of subcarriers per 1 PRB. The total of k (or the largest value) may be determined based on the system bandwidth (or the channel bandwidth, or the transmission bandwidth). In a case of using the frequency hopping, examples illustrated in FIG. 5 and FIG. 6 may be applicable.

A frequency position index is expressed in Expression 7, in a case that configured through the higher layer signaling are two parameters (an index and b in a bandwidth configuration) associated with the bandwidth to which the physical channel associated with the MTC is allocated, a parameter associated with a position of a frequency domain, and a parameter ($b_{hop}$) associated with the bandwidth to which the frequency hopping for the physical channel associated with the MTC is applied.

$$n_b = \begin{cases} \lfloor 6n_{RRC}/m_b \rfloor \bmod N_b & b \le b_{hop} \\ \{F_b(SF) + \lfloor 6n_{RRC}/m_b \rfloor\} \bmod N_b & \text{otherwise} \end{cases} \quad \text{[Expression 7]}$$

$F_b$ is a parameter indicating the shift quantity of the frequency position. $F_b$ is expressed in Expression 8.

[Expression 8]

$$F_b(SF) = \begin{cases} (N_b/2) \left\lfloor \dfrac{SF \bmod \prod_{b'=b_{hop}}^{b} N_{b'}}{\prod_{b'=b_{hop}}^{b-1} N_{b'}} \right\rfloor + \left\lfloor \dfrac{SF \bmod \prod_{b'=b_{hop}}^{b} N_{b'}}{2 \prod_{b'=b_{hop}}^{b-1} N_{b'}} \right\rfloor & \text{if } N_b \text{ is even number} \\ \lfloor N_b/2 \rfloor \left\lfloor \dfrac{SF}{\prod_{b'=b_{hop}}^{b-1} N_{b'}} \right\rfloor & \text{if } N_b \text{ is odd number} \end{cases}$$

$m_b$ and $N_b$ are configured to correspond to the configuration associated with the bandwidth to which the physical channel associated with the MTC is allocated. The value of b is configured through the higher layer signaling. The index and b (or $b_{hop}$) in the bandwidth configuration may be managed in an identical table. The bandwidth to which the physical channel associated with the MTC is allocated is configured based on values of the index and b in the bandwidth configuration. Further, the bandwidth to which the frequency hopping for the physical channel associated with the MTC is applicable is configured, based on the values of the index and $b_{hop}$ in the bandwidth configuration.

In FIG. 7, the physical channel for the MTC terminal will not be transmitted at Index 0 in a case that the correspondence between a candidate to an index is greater than or equal to 1. Further, the MTC terminal will not transmit the physical channel at Index 0. That is, since the physical channel for the MTC terminal does not overlap to the PSS/SSS/PBCH resource, interference to the LTE terminal can be reduced, and communication efficiency can be increased. Further, messages/information related to the SIB/RAR/paging for the MTC terminal may be transmitted, in Index 0. Such messages/information may be transmitted on the DL-SCH. Such messages/information may be transmitted at a predetermined subframe/slot (the subframe/slot that does not collide with at least the PBCH) in Index 0, in a case that a bit indicating the support for a function associated with the MTC is set to a predetermined value (for example, 1) by using the PBCH (MIB) bit.

In a case where the MTC terminal receives the PBCH (MIB) in every 40 ms cycle and a bit in the MIB indicating that the base station device supporting the function associated with the MTC is set to a predetermined value (for example, 1), the MTC terminal may additionally receive the PBCH (MIB) and/or the MTC SIB in the subframe other than the subframe (subframe 0) in which the PBCH is transmitted. The MTC terminal may determine the number of subframes for additional reception in accordance with a repetition level. Further, the base station device may transmit the PBCH in a subframe different from a predetermined subframe, in a case that the bit indicating the support for the function associated with the MTC is set to the MIB.

The MTC terminal, when receiving the PSS/SSS, may estimate the resource to which the MTC SIB is mapped (the resource block number, the subframe number, or the index values in FIG. 5) from the cell ID based on the PSS/SSS to perform a reception process. For example, the MTC terminal may calculate the index (the indexes illustrated in FIG. 5 to FIG. 7), to which the resource with the mapped MTC SIB is allocated, based on the cell ID and/or the repetition level. From which subframe number in which radio frame the MTC SIB transmission starts may be determined based on repetition level or the cell ID.

The base station device and/or the terminal device may perform sequence hopping based on the slot number or the subframe number during the repeated transmission to generate a sequence, or may use the identical sequence during the repeated transmission. Information instructing such switching may be notified to the terminal device by using the higher layer signaling or the PDCCH/EPDCCH.

The base station device and/or the terminal device may not adjust (control) the power of the transmission signal during the repeated transmission. That is, the base station device and/or the terminal device may continuously transmit by the same transmission power during the repeated transmission.

The above-described various parameters may be configured for each physical channel. Further, the above-described various parameters may be configured for each terminal device. Further, the above-described parameters may be configured commonly for the terminal devices. Here, the above-described various parameters may be configured by using the system information. Further, the above-described various parameters may be configured by using the higher layer signaling (RRC signaling, MAC CE). Further, the above-described various parameters may be configured by using the PDCCH/EPDCCH. The above-described various parameters may be configured as broadcast information. Further, the above-described various parameters may be configured as unicast information.

Note that, in the above-described embodiments, the power value demanded in each PUSCH transmission has been described that they are calculated based on: parameters configured by higher layers; an adjustment value determined by the number of PRBs allocated to the PUSCH transmission by a resource assignment; a downlink path loss and a coefficient by which the path loss is multiplied; an adjustment value determined by a parameter indicating an offset of the MCS applied to UCI; a value based on a TPC command, and the like. Moreover, descriptions have been given that the power value demanded by each PUCCH transmission is calculated based on: a parameter configured by a higher layer; a downlink path loss; an adjustment value determined by the UCI transmitted by the PUCCH; an adjustment value determined by the PUCCH format; an adjustment value determined by the antenna port number used for the PUCCH transmission; the value based on the TPC command, and the like. However, the calculation of the power value is not limited to the above descriptions. An upper limit value may be set for the demanded power value, and the smallest value of the value based on the above-described parameters and the upper limit value (e.g., $P_{CMAX, c}$, which is the maximum output power value of a serving cell c) may be used as the demanded power value.

A program running on each of the base station device and the terminal device according to one aspect of the present invention may be a program for controlling a Central Processing Unit (CPU) and the like (a program for causing a computer to operate) to enable the functions in the above-described embodiments of the present invention. The information exchanged between these devices is temporarily stored in a Random Access Memory (RAM) while being processed. Subsequently, the information is stored in various types of Read Only Memory (ROM) such as a flash ROM and a Hard Disk Drive (HDD), and is read by the CPU to be modified or rewritten, as appropriate.

Moreover, the terminal device and/or the base station device in the above-described embodiments may be partially achieved by a computer. In such a case, a program for enabling such control functions may be recorded on a computer-readable recording medium to cause a computer system to read the program recorded on the recording medium for execution.

Note that "computer system" serves as a computer system built into a terminal device or a base station device, and such a computer system may include an OS and hardware components such as a peripheral device. Furthermore, "computer-readable recording medium" refers to a portable medium, such as a flexible disk, a magneto-optical disk, a ROM, and a CD-ROM, and a storage device, for example, a hard disk built into the computer system.

Moreover, "computer-readable recording medium" may include a medium that dynamically retains a program for a short period of time, such as a communication line that is used to transmit the program over a network such as the Internet or over a communication line such as a telephone line, and may include a medium that retains a program for a given period of time, such as a volatile memory within the computer system that functions as a server or a client in such a case. Furthermore, the above-described program may be configured to enable some of the functions described above, and additionally may be configured to enable the functions described above, in combination with a program already recorded in the computer system.

Furthermore, the base station device in the above-described embodiments can be achieved as an aggregation (a device group) including multiple devices. Devices constituting such a device group may be each equipped with some or all portions of each function or each functional block of the base station device in the above-described embodiments. As the device group, at least general functions or general functional blocks of the base station device may be provided. Furthermore, the terminal device in the above-described embodiments can also communicate with the base station device as an aggregate.

Furthermore, the base station device in the above-described embodiments may be an Evolved Universal Terrestrial Radio Access Network (EUTRAN). Furthermore, the base station device 2 in the above-described embodiments may have some or all portions of the function of a higher node than an eNodeB.

Furthermore, some or all portions of each of the terminal device and the base station device in the above-described embodiments may be achieved as an LSI, which is a typical integrated circuit, or may be achieved as a chip set. The functional blocks of the terminal device and the base station device may be individually achieved as a chip, or some or all of the functional blocks may be integrated into a chip. The circuit integration technique is not limited to LSI, and may be achieved as a special circuit or a multi-purpose processor. Furthermore, according to advances in semiconductor technologies, a circuit integration technology that can replace LSI appears, it is also possible to use an integrated circuit based on the technology.

Furthermore, in the above-described embodiments, a cellular mobile station device (cellular phone, portable terminal) has been described as one example of a terminal device or a communication device. However, the present invention is not limited to this, and is applicable to a fixed-type electronic apparatus installed indoors or outdoors, or a stationary-type electronic apparatus, for example, a terminal device or a communication device, such as an Audio-Video (AV) apparatus, a kitchen appliance, a cleaning or washing machine, an air-conditioning apparatus, office equipment, a vending machine, vehicle loading machine for car navigation or the like, and other household apparatuses.

From the foregoing, the present invention provides the following characteristics.

(1) A terminal device according to one aspect of the present invention is a terminal device configured to communicate with a base station device, the terminal device including: a transmission unit configured to transmit capability information indicating that a first capability and a second capability are supported; and a reception unit configured to receive, via higher layer signaling, a first parameter corresponding to the first capability and a second parameter corresponding to the second capability. When the first parameter and the second parameter are configured, the transmission unit repeatedly transmits a Physical Uplink Shared CHannel (PUSCH) and a Physical Uplink Control CHannel (PUCCH) the same number of times, using an identical subframe.

(2) The terminal device according to one aspect of the present invention is the above-described terminal device, and when the PUSCH and the PUCCH are transmitted in the same subframe, the transmission unit sets transmit power for the PUCCH with a predefined power offset.

(3) The terminal device according to one aspect of the present invention is the above-described terminal device, and when the PUCCH is not transmitted in an identical subframe to a subframe for the PUSCH, the transmission unit sets transmit power for the PUCCH without the predefined power offset.

(4) A base station device according to one aspect of the present invention is a base station device configured to communicate with a terminal device, the base station device including: a reception unit configured to receive, from the terminal device, capability information indicating that a first capability and a second capability are supported; and a transmission unit configured to, when there is a cell that allows access from a terminal device supporting the capability information, transmit a first parameter corresponding to the first capability and a second parameter corresponding to the second capability via higher layer signaling. In a case where a cell that allows access from a terminal device supporting the capability information is present, the transmission unit transmits a predefined power offset for a Physical Uplink Control CHannel (PUCCH) via higher layer signaling.

(5) A method according to one aspect of the present invention is a method by a terminal device configured to communicate with a base station device, the method including the steps of: transmitting capability information indicating that a first capability and a second capability are supported; receiving, via higher layer signaling, a first parameter corresponding to the first capability and a second parameter corresponding to the second capability; and when the first parameter and the second parameter are configured, repeatedly transmitting a Physical Uplink Shared CHannel (PUSCH) and a Physical Uplink Control CHannel (PUCCH) the same number of times using an identical subframe.

(6) The method according to one aspect of the present invention is the above-described method, and further includes the steps of: when the PUSCH and the PUCCH are transmitted in the identical subframe, setting transmit power for the PUCCH with a predefined power offset; and when the PUCCH is not transmitted in the identical subframe to a subframe for the PUSCH, setting the transmit power for the PUCCH without the predefined power offset.

(7) A method according to one aspect of the present invention is a method of a base station device configured to communicate with a terminal device, the method including the steps of: receiving, from the terminal device, capability information indicating that a first capability and a second capability are supported; transmitting a first parameter corresponding to the first capability and a second parameter corresponding to the second capability via higher layer signaling, in a case where a cell that allows access from a terminal device supporting the capability information s present; and transmitting a predefined power offset for a Physical Uplink Control CHannel (PUCCH) via higher layer signaling, in a case where a cell that allows access from a terminal device supporting the capability information is present.

(8) A terminal device according to one aspect of the present invention is a terminal device configured to communicate with a base station device, the terminal device including: a reception unit configured to receive a Master Information Block (MIB) and one or more System Information Blocks (SIBs); and a transmission unit configured to transmit capability information indicating that the terminal device has a first capability. When a cell is indicated by the MIB or the SIB, to which the terminal device having the first capability is allowed to make access, and when information on a configuration of a Physical Downlink Control CHannel (PDCCH) is included in the MIB or in an SI message, the reception unit receives, from the cell, a PDCCH based on a resource allocation based on the information on the configuration of the PDCCH.

(9) The terminal device according to one aspect of the present invention is the above-described terminal device, and the reception unit detects, from the PDCCH, a Downlink Control Information (DCI) format along with a Cyclic Redundancy Check (CRC) scrambled with a first Radio Network Temporary Identifier (RNTI) and detects a Paging CHannel (PCH), based on a resource allocation detected from the DCI format.

(10) The terminal device according to one aspect of the present invention is the above-described terminal device, and the reception unit receives the first RNTI via higher layer signaling.

(11) The terminal device according to one aspect of the present invention is the above-described terminal device, and when the information on the configuration of the PDCCH is not included in the MIB or in the SIB, and when a second RNTI for a PCH is configured in information on a configuration of an Enhanced PDCCH (EPDCCH), the reception unit detects, from the EPDCCH, the DCI format along with the CRC scrambled with the second RNTI, and detects a PCH based on the DCI format.

(12) The terminal device according to one aspect of the present invention is the above-described terminal device, and when the information on the configuration of the PDCCH is not included in the MIB or in the SIB, and when a second RNTI for a PCH is not configured in information on a configuration of the EPDCCH, and when the first capability information corresponds to downlink transmission bandwidth included in the MIB or in the SIB, the reception unit detects, from the PDCCH allocated to the downlink transmission bandwidth, the DCI format along with a CRC scrambled with a third RNTI, which is a predefined value, and detects a PCH based on the DCI format.

(13) The terminal device according to one aspect of the present invention is the above-described terminal device, and a resource allocation based on the configuration of the PDCCH is represented by a resource block index corresponding to the downlink transmission bandwidth indicated by the MIB or the SIB.

(14) A base station device according to one aspect of the present invention is a base station device configured to communicate with a terminal device, the base station device including: a transmission unit configured to, when the terminal device indicates that a first capability is supported, transmit information indicating whether a cell that allows access from the terminal device supporting the first capability is present, via higher layer signaling including system information. When a cell that allows access from the terminal device supporting the first capability is present, the transmission unit sets, in a master information block or in a system information block, information on a configuration of a Physical Downlink Control CHannel (PDCCH) for the terminal device supporting the first capability.

(15) The base station device according to one aspect of the present invention is the above-described base station device, and the transmission unit transmits, based on a configuration of a PDCCH, a Downlink Control Information (DCI) format along with a Cyclic Redundancy Check (CRC) scrambled with a first Radio Network Temporary Identifier (RNTI), and the first RNTI is an RNTI of a Paging CHannel (PCH) for the terminal device supporting the first capability.

(16) A method according to one aspect of the present invention is a method by a terminal device configured to communicate with a base station device, the method including the steps of: receiving a Master Information Block (MIB); receiving one or more System Information Blocks (SIBs); transmitting capability information indicating that the terminal device has a first capability; and receiving the PDCCH from the cell according to a resource allocation based on the information on the configuration of the PDCCH, when a cell to which the terminal device having the first capability is allowed to make access, is indicated by the MIB or the SIB, and when information on a configuration of a Physical Downlink Control CHannel (PDCCH) is included in the MIB or in the SI message.

(17) A method according to one aspect of the present invention is a method by a base station device configured to communicate with a terminal device, the method including the steps of: transmitting information indicating whether a cell that allows access from the terminal device supporting the first capability is present, when the terminal device indicates that a first capability is supported, via higher layer signaling including system information; and setting information on a configuration of a Physical Downlink Control CHannel (PDCCH) for the terminal device supporting the first capability, to a master information block or a system information block, when a cell that allows access from the terminal device supporting the first capability is present.

(18) A terminal device according to one aspect of the present invention is a terminal device configured to communicate with a base station device, the terminal device including: a transmission unit configured to transmit, to the base station device, capability information indicating that a first capability is supported; and a reception unit configured to detect a Master Information Block (MIB) from a Physical Broadcast CHannel (PBCH). When access from the terminal device supporting the first capability is allowed by the base station device, the reception unit detects, from the MIB, first information related to a downlink resource allocation for the terminal device supporting at least the first capability.

(19) The terminal device according to one aspect of the present invention is the above-described terminal device, and the reception unit receives, based on the first information, a Physical Downlink Control CHannel (PDCCH) for the terminal device supporting at least the first capability.

(20) The terminal device according to one aspect of the present invention is the above-described terminal device, when a Cyclic Redundancy Check (CRC) is scrambled with a System Information-Radio Network Temporary Identifier (SI-RNTI) in the PDCCH, the reception unit detects, from a Physical Downlink Shared CHannel (PDSCH) corresponding to the PDCCH, system information for the terminal device supporting the first capability.

(21) The terminal device according to one aspect of the present invention is the above-described terminal device, and a value of the SI-RNTI is a default value.

(22) The terminal device according to one aspect of the present invention is the above-described terminal device, and the reception unit detects, from the system information, information on a configuration of a physical channel/physical signal for the terminal device supporting the first capability.

(23) A base station device according to one aspect of the present invention is a base station device configured to communicate with a terminal device, the base station device including: a transmission unit configured to set, in a Master Information Block (MIB), first information related to a downlink resource allocation for a terminal device supporting at least a first capability and to transmit the first information. The transmission unit transmits a Physical Downlink Control CHannel (PDCCH) corresponding to the downlink resource allocation.

(24) A method according to one aspect of the present invention is a method by a terminal device configured to communicate with a base station device, the method including the steps of: transmitting, to the base station device, capability information indicating that a first capability is supported; detecting a Master Information Block (MIB) from a Physical Broadcast CHannel (PBCH); and detecting, from the MIB, first information related to a downlink resource allocation for the terminal device supporting at least the first capability, when access from the terminal device supporting the first capability is allowed by the base station device.

(25) A method according to one aspect of the present invention is a method by a base station device configured to communicate with a terminal device, the method including the steps of: setting, in a Master Information Block (MIB), first information related to a downlink resource allocation for a terminal device supporting at least a first capability and transmitting the first information; and transmitting a Physical Downlink Control CHannel (PDCCH) corresponding to the downlink resource allocation, when the downlink resource allocation is set in the MIB.

(26) A terminal device according to one aspect of the present invention is a terminal device configured to communicate with a base station device, the terminal device including: a buffer portion configured to, temporarily buffer the information on the configuration of the PDCCH when a first capability is supported, and when information on a configuration of a Physical Downlink Control CHannel (PDCCH) for a terminal device having the first capability is included in a Master Information Block (MIB). When an overflow occurs due to a reception of a System Information Block (SIB), the buffer portion gives priority to holding the information on the configuration of the PDCCH and flushes the SIB that has been overflowed.

(27) The terminal device according to one aspect of the present invention is the above-described terminal device, and when an overflow occurs due to a reception of paging information, the buffer portion gives priority to holding the information on the configuration of the PDCCH and flushes the paging information that has been overflowed.

(28) The terminal device according to one aspect of the present invention is the above-described terminal device, and when the information on the configuration of the PDCCH is included in the SIB and an overflow occurs due to receptions of the MIB and the SIB, the buffer portion flushes the MIB.

(29) The terminal device according to one aspect of the present invention is the above-described terminal device, and when an overflow occurs due to the reception of paging information providing a notification of a modification to the SIB and the reception of the MIB and the paging information, the buffer portion flushes the MIB.

(30) A method according to one aspect of the present invention is a method by a terminal device configured to communicate with a base station device, the method including the steps of: temporarily buffering the information on the configuration of the PDCCH, when a first capability is supported and when information on a configuration of a Physical Downlink Control CHannel (PDCCH) for the terminal device having the first capability is included in a Master Information Block (MIB); giving priority to holding, the information on the configuration of the PDCCH when an overflow occurs due to a reception of a System Information Block (SIB); and flushing the SIB that has been overflowed.

(31) A method according to one aspect of the present invention is the above-described method, including the steps of: giving priority to holding the information on the configuration of the PDCCH, when an overflow occurs due to the reception of paging information; and flushing the paging information that has been overflowed.

(32) The method according to one aspect of the present invention is the above-described method, including the step of flushing the MIB, when the information on the configuration of the PDCCH is included in the SIB, and when an overflow occurs due to the reception of the MIB and the SIB.

(33) The method according to one aspect of the present invention is the above-described method, including the step of flushing the MIB, when an overflow occurs due to the reception of paging information providing notification of a modification to the SIB and reception of the MIB and the paging information.

(34) A terminal device according to one aspect of the present invention is a terminal device configured to communicate with a base station device. The terminal device includes a reception unit configured to receive a Master Information Block (MIB) from a Physical Broadcast CHannel (PBCH). In a case where, from the MIB, a bit associated with Machine Type Communication (MTC) is set to a predetermined value, the reception unit receives a System Information Block (MTC SIB) including a physical channel configuration associated with the MTC from a predetermined subframe.

(35) The terminal device according to one aspect of the present invention is the terminal device, and the reception unit receives a downlink physical channel associated with the MTC based on the physical channel configuration associated with the MTC.

(36) The terminal device according to one aspect of the present invention is the terminal device, and the reception unit receives the downlink physical channel associated with the MTC for performing frequency hopping in a repeated reception, in a case where the physical channel configuration associated with the MTC includes information, indicating correspondence between an index associated with narrow bandwidth and a candidate index, as information related to a resource allocation.

(37) The terminal device according to one aspect of the present invention is the terminal device, including a transmission unit for performing the frequency hopping for an uplink physical channel associated with the MTC in a repeated transmission, in the case where the physical channel configuration associated with the MTC includes the information indicating the correspondence between the index associated with the narrow bandwidth and the candidate index as the information related to the resource allocation.

(38) A base station device according to one aspect of the present invention is a base station device configured to communicate with a terminal device, the base station including a transmission unit configured to transmit a Physical Broadcast CHannel (PBCH) in a given period and in a subframe, and the transmission unit, in a case of supporting a function associated with a Machine Type Communication (MTC), sets a bit associated with the MTC in a Master Information Block (MIB), and transmits the PBCH, to which the MIB is mapped, in the subframe and a given subframe different from the subframe.

(39) The base station device according to one aspect of the present invention is the base station device, and the transmission unit transmits a physical channel configuration associated with the MTC through higher layer signaling in a case of setting the bit in the MIB.

(40) The base station device according to one aspect of the present invention is the base station device, and the transmission unit performs frequency hopping in a repeated transmission, in a case where the physical channel configuration associated with the MTC includes information, indicating correspondence between an index associated with narrow bandwidth and a candidate index, as information related to a resource allocation.

(41) A method according to one aspect of the present invention is a method by a terminal device configured to communicate with a base station device, the method including the steps of: receiving a Master Information Block (MIB) from a Physical Broadcast CHannel (PBCH); and in a case where, from the MIB, a bit associated with Machine Type Communication (MTC) is set to a predetermined value, receiving a System Information Block (MTC SIB) including a physical channel configuration associated with the MTC from a predetermined subframe.

(42) A method according to one aspect of the present invention is a method by a base station device configured to communicate with a terminal device, the method including the steps of: transmitting a Physical Broadcast CHannel (PBCH) in a given period and in a subframe, in a case of supporting a function associated with a Machine Type Communication (MTC); setting a bit associated with the MTC to a Master Information Block (MIB); and transmitting the PBCH, to which the MIB is mapped, in the subframe and in a given subframe different from the subframe.

Heretofore, the embodiments of the present invention have been described in detail with reference to the drawings, but the specific configuration is not limited to the embodiments, and includes, for example, design variations that fall within the scope that does not depart from the gist of the present invention. Furthermore, various modifications are possible within the scope defined by claims, and embodiments that are made by suitably combining technical measures disclosed in the different embodiments are also included in the technical scope of the present invention. Furthermore, another configuration is also included such that constituent elements, each of which has been described in the above embodiments and achieve the same advantage, can be replaceable with each other

INDUSTRIAL APPLICABILITY

Some aspects of the present invention are applicable to a terminal device, a base station device, and a method that are demanded to communicate efficiently.

DESCRIPTION OF REFERENCE NUMERALS

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606 Control unit
607 Higher layer
608 Channel state measurement unit
609 Uplink subframe generation unit
610 Uplink control information generation unit
611, 612 SC-FDMA signal transmission unit
613, 614 Transmit antenna

The invention claimed is:

1. A terminal device comprising:
a transmitter; and
a receiver configured to receive a Master Information Block (MIB) on a Physical Broadcast Channel (PBCH), the MIB including a first configuration associated with a machine type communication (MTC), wherein
the receiver is configured to receive a system information block (SIB) associated with the MTC on a physical downlink shared channel (PDSCH) in a subframe based on the first configuration,
the SIB includes a second configuration for a PDSCH associated with the MTC,
the second configuration includes a first parameter indicating a subframe set and a second parameter indicating frequency bopping, a third parameter indicating a transport block size,
the receiver receives a downlink physical channel associated with the MTC, based on a physical channel configuration associated with the MTC,
the receiver receives the downlink physical channel associated with the MTC for performing frequency hopping in a repeated reception, in a case where the physical channel configuration associated with the MTC includes information, indicating correspondence between an index associated with narrow bandwidth and a candidate index, as information related to a resource allocation, and
the transmitter is configured to perform the frequency hopping for an uplink physical channel associated with the MTC in a repeated transmission, in the case where the physical channel configuration associated with the MTC includes the information, indicating the correspondence between the index associated with the narrow bandwidth and the candidate index, as the information related to the resource allocation.

2. A base station device comprising:
a receiver; and
a transmitter configured to transmit a Master Information Block (MIB) on a Physical Broadcast Channel (PBCH) in a given period and in a subframe, the MIB including a first configuration associated with a machine type communication (MTC),
wherein the transmitter is configured to set the first configuration and transmit a system information block (SIB) associated with the MTC on a physical downlink shared channel (PDSCH) in the subframe based on the-first configuration,
the SIB includes a second configuration for a PDSCH associated with the MTC,
the second configuration includes a first parameter indicating a subframe set and a second parameter indicating frequency hopping, a third parameter indicating a transport block size,
the transmitter transmits a downlink physical channel associated with the MTC, based on a physical channel configuration associated with the MTC,
the transmitter transmits the uplink physical channel associated with the MTC for performing frequency hopping in a repeated reception, in a case where the physical channel configuration associated with the MTC includes information, indicating correspondence between an index associated with narrow bandwidth and a candidate index, as information related to a resource allocation, and the receiver is configured to perform the frequency hopping for a downlink physical channel associated with the MTC in a repeated reception, in the case where the physical channel configuration associated with the MTC includes the information, indicating the correspondence between the index associated with the narrow bandwidth and the candidate index, as the information related to the resource allocation.

3. A method by a terminal device configured to communicate with a base station device, the method comprising the steps of:
receiving a Master Information Block (MIB) on a Physical Broadcast Channel (PBCH), the MIB including a first configuration associated with a machine type communication (MTC);
receiving a system information block (SIB) associated with the MTC on a physical downlink shared channel (PDSCH) in a subframe based on the first configuration,
the SIB including a second configuration for a PDSCH associated with the MTC,
the second configuration including a first parameter indicating a subframe set and a second parameter indicating frequency hopping, a third parameter indicating a transport block size,
receiving a downlink physical channel associated with the MTC, based on a physical channel configuration associated with the MTC;
receiving the downlink physical channel associated with the MTC for performing frequency hopping in a repeated reception, in a case where the physical channel configuration associated with the MTC includes information, indicating correspondence between an index associated with narrow bandwidth and a candidate index, as information related to a resource allocation; and
performing the frequency hopping for an uplink physical channel associated with the MTC in a repeated transmission, in the case where the physical channel configuration associated with the MTC includes the information, indicating the correspondence between the index associated with the narrow bandwidth and the candidate index, as the information related to the resource allocation.

4. A method by a base station device configured to communicate with a terminal device, the method comprising the steps of:
transmitting a Master Information Block (MIB) on a Physical Broadcast Channel (PBCH) in a given period and in a subframe, the MIB including a first configuration associated with a machine type communication (MTC);
setting the first configuration;
transmitting a system information block (SIB) associated with the MTC on a physical downlink shared channel (PDSCH) in the subframe based on the first configuration,
the SIB including a second configuration for a PDSCH associated with the MTC,
the second configuration including a first parameter indicating a subframe set and a second parameter indicating frequency hopping, a third parameter indicating a transport block size;
transmitting a downlink physical channel associated with the MTC, based on a physical channel configuration associated with the MTC;

transmitting the uplink physical channel associated with the MTC for performing frequency hopping in a repeated reception, in a case where the physical channel configuration associated with the MTC includes information, indicating correspondence between an index associated with narrow bandwidth and a candidate index, as information related to a resource allocation; and performing the frequency hopping for a downlink physical channel associated with the MTC in a repeated reception, in the case where the physical channel configuration associated with the MTC includes the information, indicating the correspondence between the index associated with the narrow bandwidth and the candidate index, as the information related to the resource allocation.

\* \* \* \* \*